US012640811B2

(12) United States Patent
Duan et al.

(10) Patent No.: US 12,640,811 B2
(45) Date of Patent: May 26, 2026

(54) RECONFIGURABLE INTELLIGENT SURFACE (RIS) AIDED NON-TERRESTRIAL NETWORK (NTN) USER EQUIPMENT (UE) POSITIONING

(71) Applicant: QUALCOMM Incorporated, San Diego, CA (US)

(72) Inventors: Weimin Duan, San Diego, CA (US); Huilin Xu, Temecula, CA (US); Jing Lei, San Diego, CA (US); Lianghai Ji, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 449 days.

(21) Appl. No.: 18/320,123

(22) Filed: May 18, 2023

(65) Prior Publication Data

US 2024/0388361 A1    Nov. 21, 2024

(51) Int. Cl.
*H04B 7/185* (2006.01)
*H04W 72/232* (2023.01)

(52) U.S. Cl.
CPC ..... *H04B 7/18554* (2013.01); *H04B 7/18543* (2013.01); *H04W 72/232* (2023.01)

(58) Field of Classification Search
CPC ........... H04B 7/18554; H04B 7/18543; H04W 72/232; G01S 19/00; G01S 5/0226; G01S 5/0273; G01S 5/0236
See application file for complete search history.

(56) References Cited

U.S. PATENT DOCUMENTS

| | | | | |
|---|---|---|---|---|
| 11,528,657 | B1 * | 12/2022 | Mangalvedhe ... | H04W 74/0833 |
| 12,363,664 | B2 * | 7/2025 | Ghanbarinejad . | H04W 72/0446 |
| 2017/0332192 | A1 * | 11/2017 | Edge ..................... | H04W 4/029 |
| 2021/0302561 | A1 * | 9/2021 | Bayesteh ............... | G01S 13/42 |
| 2022/0014935 | A1 * | 1/2022 | Haija ................... | H04L 5/0048 |
| 2022/0353636 | A1 * | 11/2022 | Li ..................... | H04W 52/0254 |
| 2023/0008390 | A1 * | 1/2023 | Zorgui ................. | G01S 5/0205 |
| 2023/0098229 | A1 * | 3/2023 | Gurelli ..................... | G01S 5/10 |
| | | | | 455/456.1 |

(Continued)

FOREIGN PATENT DOCUMENTS

| | | | |
|---|---|---|---|
| CN | 114879233 A | 8/2022 | |
| EP | 4415174 A1 * | 8/2024 | ......... H04B 7/04013 |

(Continued)

OTHER PUBLICATIONS

Partial International Search Report—PCT/US2024/025052—ISA/EPO—Sep. 20, 2024.

(Continued)

*Primary Examiner* — Phirin Sam
*Assistant Examiner* — Tarell A Hampton
(74) *Attorney, Agent, or Firm* — QUALCOMM Incorporated

(57) ABSTRACT

Disclosed are systems, apparatuses, processes, and computer-readable media for wireless communications. For example, an example of a process may include a RIS that can receive, from a satellite, a positioning reference signal. The RIS can further reflect the positioning reference signal to produce a reflection positioning reference signal radiated towards a network device for positioning of the network device.

26 Claims, 15 Drawing Sheets

1400

(56)                    References Cited

U.S. PATENT DOCUMENTS

2023/0189021 A1*    6/2023    Ali ........................ H04W 24/02
                                                370/252
2023/0258759 A1*    8/2023    Wang ................... G01S 1/0423
                                                455/456.1
2023/0408706 A1*    12/2023   Rusek .................... G01S 19/38

FOREIGN PATENT DOCUMENTS

WO        2022015965  A1      1/2022
WO        2022197369  A2      9/2022

OTHER PUBLICATIONS

Zhao Q., et al., "Global Navigation Satellite System (GNSS): A Reconfigurable Intelligent Surface (RIS)-aided Approach", Globecom 2022, IEEE Global Communications Conference, Dec. 4, 2022, pp. 3162-3167, XP034269070, Paragraph [0I.B] Paragraph [II.A] Figure 1.
International Search Report and Written Opinion—PCT/US2024/025052—ISA/EPO—Dec. 2, 2024.

* cited by examiner

1400

1410

Receive, By A RIS From A Satellite,
A Positioning Reference Signal

1420

Reflect, By The RIS, The Positioning Reference Signal To
Produce A Reflection Positioning Reference Signal Radiated
Towards A Network Device For Positioning Of The Network
Device

RECONFIGURABLE INTELLIGENT SURFACE (RIS) AIDED NON-TERRESTRIAL NETWORK (NTN) USER EQUIPMENT (UE) POSITIONING

FIELD OF THE DISCLOSURE

The present disclosure generally relates to wireless communications. For example, aspects of the present disclosure relate to reconfigurable intelligent surface (RIS) aided non-terrestrial network (NTN) user equipment (UE) positioning.

BACKGROUND OF THE DISCLOSURE

Wireless communications systems are widely deployed to provide various types of communication content, such as voice, video, packet data, messaging, and broadcast. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as UE. Some wireless communications systems may support communications between UEs, which may involve direct transmissions between two or more UEs.

Due to larger bandwidths being allocated for wireless cellular communications systems (e.g., including 5G and 5G beyond) and more use cases being introduced into the cellular communications systems, RIS aided NTN UE positioning can be an essential feature for existing or future wireless communication systems, such as to enhance the overall spectral efficiency of the wireless communication networks.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Systems and techniques are described for wireless communications. According to at least one example, a method of wireless communication at a reconfigurable intelligent surface (RIS) is provided. The method includes: receiving, by the RIS from a satellite, a positioning reference signal; and reflecting, by the RIS, the positioning reference signal to produce a reflection positioning reference signal radiated towards a network device for positioning of the network device.

In another illustrative example, a reconfigurable intelligent surface (RIS) for wireless communication is provided. The RIS includes: at least one transceiver configured to receive, from a satellite, a positioning reference signal; and at least one element configured to reflect the positioning reference signal to produce a reflection positioning reference signal radiated towards a network device for positioning of the network device.

In another illustrative example, a non-transitory computer-readable storage medium is provided that includes instructions stored thereon which, when executed by at least one processor, causes the at least one processor to: receive, from a satellite, a positioning reference signal; and cause the positioning reference signal to be reflected to produce a reflection positioning reference signal radiated towards a network device for positioning of the network device.

In another illustrative example, an apparatus for wireless communications, comprising: means for receiving, from a satellite, a positioning reference signal; and means for causing the positioning reference signal to be reflected to produce a reflection positioning reference signal radiated towards a network device for positioning of the network device.

In some aspects, one or more of the network devices (e.g., RISs) or apparatuses described herein is, is part of, and/or includes a UE, such as a wearable device, an extended reality (XR) device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, a base station (e.g., a gNodeB (gNB), an eNodeB (eNB), or portion of a base station, such as a central unit (CU), a distributed unit (DU), a radio unit (RU), a Near-Real Time (Near-RT) RAN Intelligent Controller (RIC), or a Non-Real Time (Non-RT) RIC of a disaggregated base station), another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
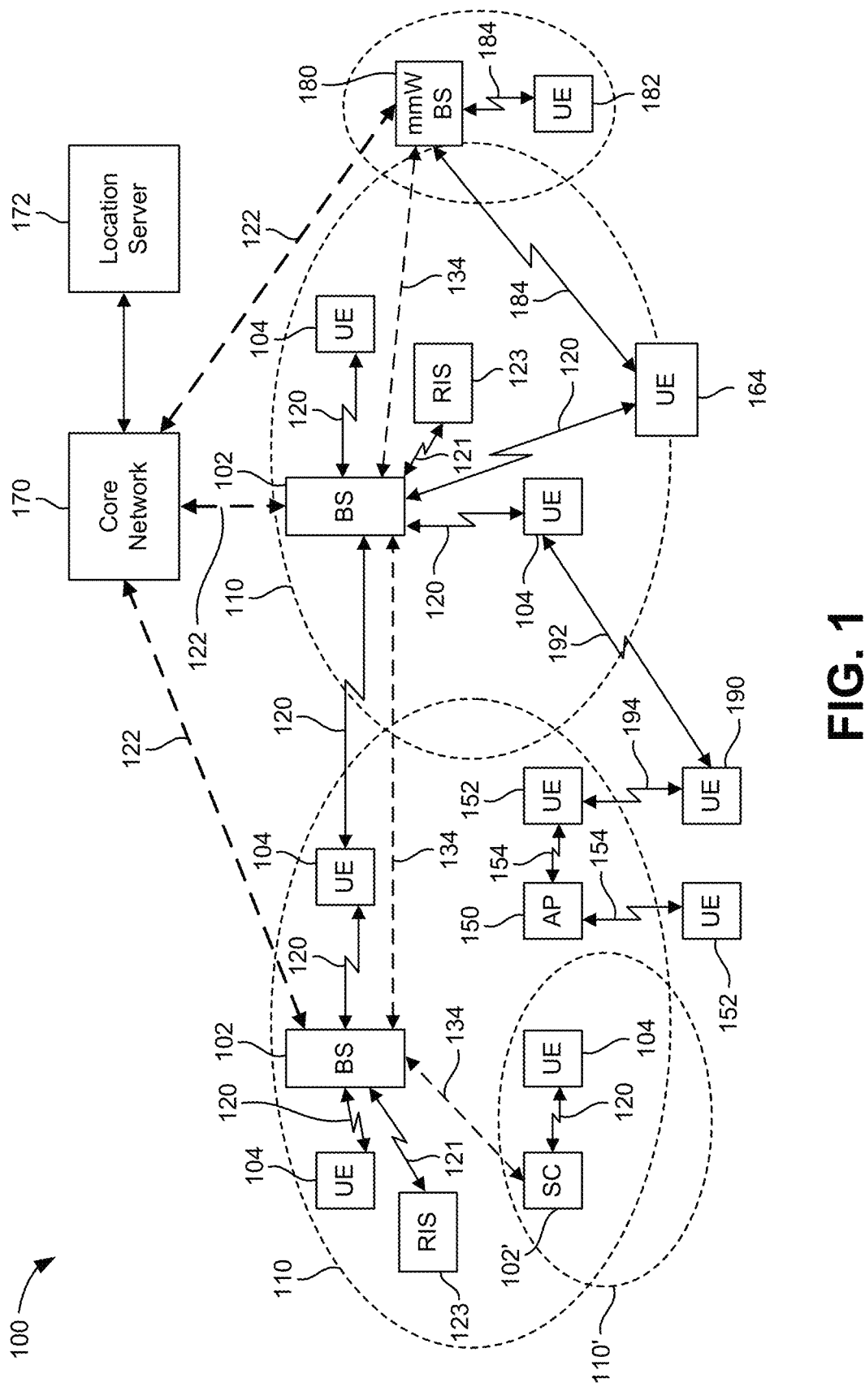
FIG. 1 is a diagram illustrating an example wireless communications system, which may be employed by the disclosed systems and techniques for reconfigurable intelligent surface (RIS) aided non-terrestrial network (NTN) user equipment (UE) positioning, in accordance with some aspects of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Wireless communication systems can use radio frequency (RF) waveforms to perform positioning to determine or estimate one or more positioning-related characteristics of a network device (e.g., a UE), such as a distance of the network device from a reference location, a location of the network device, an angle of the network device from the reference location, velocity of the network device, any combination thereof, and/or other positioning-related characteristics. A network device may include a UE (e.g., a smart phone), a vehicle, or other type of device.

An example wireless communication system includes at least one transmitter (and/or transceiver), at least one receiver (and/or transceiver), and at least one processor. During operation of the wireless communication system for positioning, the at least one transmitter (and/or transceiver) can transmit an electromagnetic (EM) signal in the RF domain towards a network device. The network device, operating as a receiver, receives the signal, which provides information or properties regarding the network device, such as network device's location and speed. The at least one processor, which may be associated with the network device, can utilize the information from the received signal to determine information or properties of the network device (e.g., network device's location and speed).

A reconfigurable intelligent surface (RIS) is a programmable array structure that can be used to control the propagation of electromagnetic (EM) waves (e.g., steering the RF beam) by changing the electric and magnetic properties of the surface of the RIS. The RIS includes an array of metamaterial RIS elements (e.g., which may be referred to as meta-elements), which are composed of ultra-thin surfaces inlaid with multiple wavelength scatters. The electromagnetic properties of the RIS elements can be dynamically controlled by applying a control signal to tunable elements (e.g., PIN diodes, varactor diodes, and/or other tunable elements) on the RIS elements, which can enable active and intelligent modulation of electromagnetic waves in a programmable manner to form electromagnetic fields with controllable amplitude, phase, polarization, and/or frequency. For example, an electromagnetic response (e.g., a phase shift, which steers the RF beam) of the RIS elements can be controlled by programmable PIN diodes.

RISs can shape the wireless environment to a desirable form at low cost. In practice, RISs have at least three types of implementations, including reflective (e.g., where signals can be reflected by the RIS), transmissive (e.g., where signals can penetrate the RIS), and hybrid (e.g., where the RIS may have a dual function of reflection and transmission).

Reconfigurable intelligent surfaces (RISs) are traditionally utilized for communications. As described herein, systems, apparatuses, methods (also referred to as processes), and computer-readable media (collectively referred to herein as "systems and techniques") are described for using RISs to assist in positioning of one or more network devices (e.g., to determine a position, location, and/or other characteristic of the one or more network devices). RIS-assisted positioning may require a higher accuracy (e.g., higher precision) of the RIS position than needed for RIS-assisted communications.

Traditional positioning without the use of a RIS can present many challenges, which may include, but are not limited to, a limited coverage distance due to an in-return transmission, a coverage hole (e.g., a hole in the coverage area) when there is no line of sight (LOS) link between the network device (e.g., a base station operating as a transmitter) and the network device (e.g., UE operating as a receiver), and an insufficient number of positioning reference points because one network device (e.g., a base station) can only provide a single reference point. Employing a RIS to assist in positioning (e.g., RIS-based positioning) using the systems and techniques described herein can provide many benefits including, but not limited to, extending the coverage distance by using RIS beamforming, eliminating a coverage hole by the RIS operating as a relay (e.g., the RIS may be flexibly deployed to have a LOS link to the coverage hole of the base station), and adding an additional reference point for the position of the RIS.

As previously noted, a RIS may operate as a relay that reflects positioning signals (e.g., originally radiated from a transmitter, such as a base station) to produce reflection beams that are directed towards the network device for the positioning by a receiver (e.g., user equipment) of that network device. Reflection coefficients of the meta-elements of the RIS can control the direction of the propagation of the reflection beams. The amplitude and phase of a reflection coefficient at each meta-element can vary with frequency. The amplitude/phase of the reflection coefficients versus the frequency characteristics can depend upon the RIS hardware structure (e.g., a RIS including meta-elements realized by PIN diodes or varactor diodes).

Various different types of systems, such as terrestrial network (TN) and non-terrestrial network (NTN) systems, may employ RISs to assist in positioning (e.g., RIS-based positioning for UE positioning). TN systems are systems that rely solely upon a physical infrastructure built on the ground (e.g., a cellular network including base stations). Conversely, NTN systems are systems that utilize some ground-based technologies (e.g., a cellular network) as well as aerial devices (e.g., satellites). For example, NTN systems may include, but are not limited to, one or more terrestrial terminals (e.g., a UE, such as a smartphone), one or more airborne or space devices, one or more service links between terrestrial and airborne/space devices, and one or more feeder links that connect the NTN to a TN. The airborne or space devices may include satellites, unmanned aerial vehicles (UAVs), and/or high-altitude platform systems (HAPS), which have a higher altitude than UAVs, but have a lower altitude than satellites.

In NTN systems, discontinuous coverage of a UE may occur. For example, radio coverage may not be continuous due to a sparse number of satellites deployed within the NTN system. In some cases, satellite assistance information can be used by a UE for predicting a coverage discontinuity. For example, a system information block yy (SIByy) can be used to broadcast the satellite assistance information to a UE. The SIByy may include mean values of the orbital parameters for up to N number of neighboring satellites (e.g., where N=4 satellites is a baseline). For a quasi-earth fixed cell, the satellite start time(s) can also broadcasted within the SIByy. The SIByy may further include beam information, such as a beam footprint reference point on the ground and a satellite beam coverage radius. A dedicated radio resource control (RRC) signal and/or access stratum/non-access stratum (AS/NAS) interactions may also be utilized for broadcasting the satellite assistance information. When the UE is in a discontinuous coverage scenario, the UE may not be required to perform any idle task, and in some cases, timers may be implemented in the UE for the UE to log measurements at certain times and/or time intervals.

As noted above, a RIS is an artificial structure with engineered EM properties, which can collect wireless signals from a transmitter and passively beamform the signals into a beam(s) radiating towards a desired receiver(s). In cellular systems, the transmitter(s) and the receiver(s) may each be in the form of a base station or a UE. RISs may be employed to extend the coverage area of cellular systems (e.g., 5G cellular systems) while having a negligible power consumption. In cellular systems, RISs can operate as a near passive devices that can reflect impinging waves to a desired direction(s), where the reflection direction(s) can be controlled by a base station (e.g., gNB).

In NTN systems, in some cases, UEs (e.g., RedCap UEs and/or eRedCap UEs) may have discontinuous coverage (e.g., a UE may be under a coverage hole). In low earth orbit (LEO) satellite-based UE positioning, the satellite visibility can limit the positioning accuracy of the UE greatly. In many LEO systems, the UE, at most locations, may only observe one or two satellites at a time. Discontinuous coverage and dynamic positioning reference signal (PRS) availability can result in unnecessary UE power consumption. As such, as motivated by these observations, employing RISs for NTN UE positioning to extend the coverage area to reduce discontinuous coverage can be beneficial.

In one or more aspects of the present disclosure, the systems and techniques described herein provide solutions for RIS aided NTN UE positioning. These solutions can employ one or more RISs to enhance NTN cell coverage to ensure a consistent positioning service experience. For a UE without the use of Global Navigation Satellite System (GNSS), the positioning service may be even more critical, as it may impact the communication operations. In one or more examples, one or more RISs may be employed to serve as an additional anchor(s) to enhance UE positioning (e.g., especially for use with satellite constellations that provide limited satellite visibility at the UE). In one or more examples, the solutions also provide some UE power saving enhancements.

Additional aspects of the present disclosure are described in more detail below.

As used herein, the terms "user equipment" (UE), "network device," "network entity," and like terms are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity (also referred to as a network device) can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" (or "network device") or "base station" (e.g., with an aggregated/monolithic base station architecture or disaggregated base station architecture) may refer to a single physical Transmission-Reception Point (TRP) or to multiple physical Transmission-Reception Points (TRPs) that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal includes an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100, which may be employed by the disclosed systems and techniques described herein for RIS aided NTN UE positioning. The wireless communications system 100 (which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The base stations 102 may communicate with one or more reconfigurable intelligent surfaces (RISs) 123 via a communications link 121. As described herein, a RIS can be employed for communications and/or positioning (e.g., to determine a position, location, and/or other characteristic of a network device, such as a UE). The RIS 123 can include a programmable array structure that can be used to control the propagation of electromagnetic (EM) waves (e.g., by steering RF beams from the base stations 102) by changing the electric and magnetic properties of the surface of the RIS 123. For instance, the RIS 123 can include an array of metamaterial RIS elements (or meta-elements) that are made up of ultra-thin surfaces inlaid with multiple wavelength scatters. The electromagnetic properties of the RIS elements can be dynamically controlled by applying a control signal to tunable elements (e.g., PIN diodes, varactor diodes, and/or other tunable elements) on the RIS elements, which can enable active and intelligent modulation of electromagnetic waves in a programmable manner to form electromagnetic fields with controllable amplitude, phase, polarization, and/or frequency. For example, an electromagnetic response (e.g., a phase shift, which steers the RF beam) of the RIS elements can be controlled by programmable PIN diodes.

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc. utilizing the ultra-wideband (UWB) spectrum. The UWB spectrum can range from 3.1 to 10.5 GHZ.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHZ with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node or entity (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receiving beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain of other beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a network node or entity (e.g., a base station). The UE can then form a transmit beam for sending one or more uplink reference signals (e.g., uplink positioning reference signals (UL-PRS), sounding reference signal (SRS), demodulation reference signals (DMRS), PTRS, etc.) to that network node or entity (e.g., a base station) based on the parameters of the receive beam.

Note that a "downlink" beam may be either a transmit beam or a receive beam, depending on the entity forming it. For example, if a network node or entity (e.g., a base station) is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a network node or entity (e.g., a base station) is forming the uplink beam, it is an uplink receive beam, and if a UE is forming the uplink beam, it is an uplink transmit beam.

In 5G, the frequency spectrum in which wireless network nodes or entities (e.g., base stations 102/180, UEs 104/182) operate is divided into multiple frequency ranges, FR1 (from 450 to 6000 Megahertz (MHz)), FR2 (from 24250 to 52600 MHZ), FR3 (above 52600 MHZ), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHZ aggregated carriers in a multi-carrier system would theoretically lead to a two-fold increase in data rate (i.e., 40 MHz), compared to that attained by a single 20 MHz carrier.

In order to operate on multiple carrier frequencies, a base station 102 and/or a UE 104 is equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on. As noted above, UE 104 and UE 190 can be configured to communicate using sidelink communications. In some cases, a sidelink transmission can include a request for feedback (e.g., a hybrid automatic repeat request (HARQ)) from the receiving UE.

Figure 2:
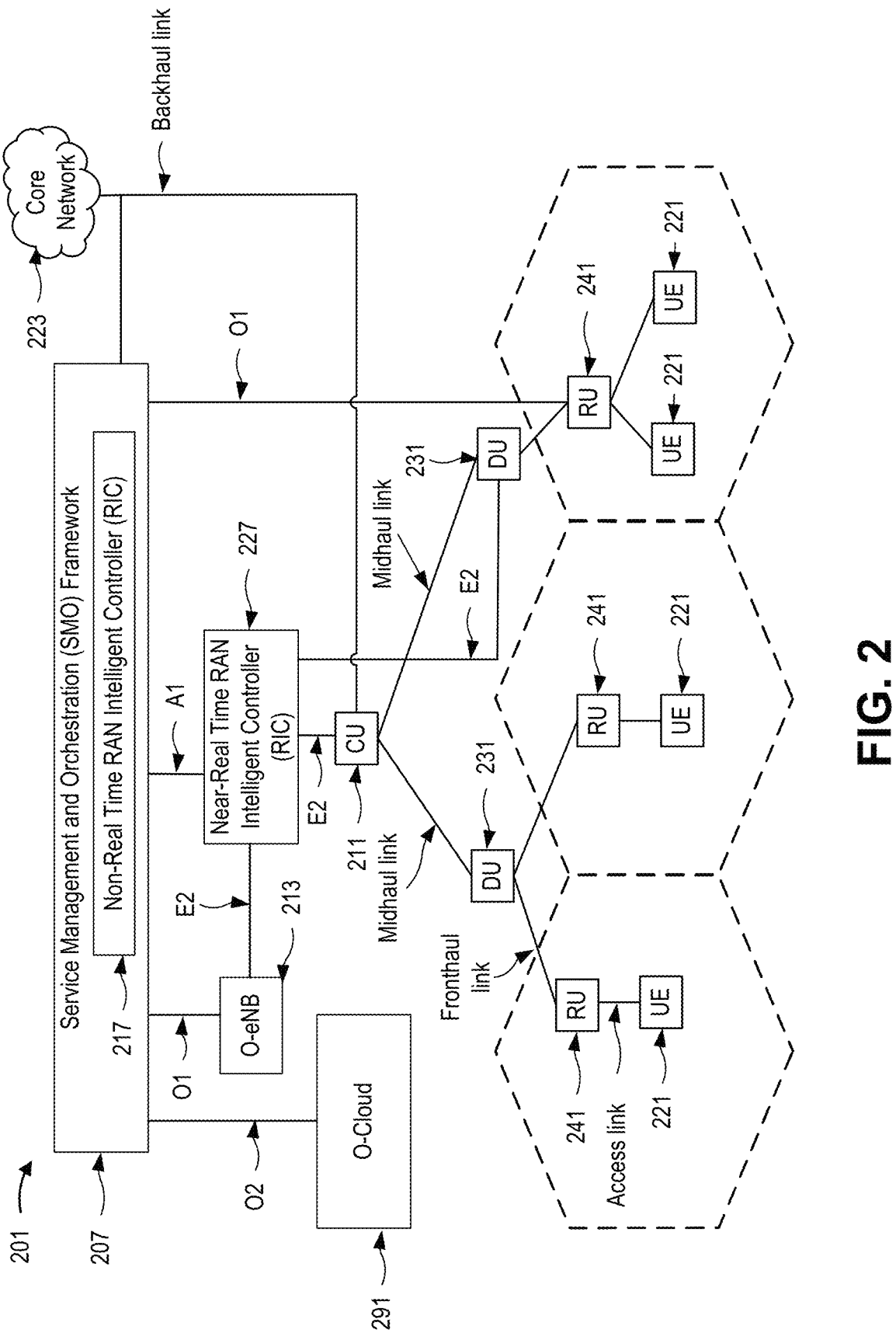
FIG. 2 is a diagram illustrating an example of a disaggregated base station architecture, which may be employed by the disclosed systems and techniques for RIS aided NTN UE positioning, in accordance with some aspects of the present disclosure.

FIG. 2 is a diagram illustrating an example of a disaggregated base station architecture, which may be employed by the disclosed systems and techniques for multi-RIS aided NTN UE positioning. Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, AP, a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

As previously mentioned, FIG. 2 shows a diagram illustrating an example disaggregated base station 201 architecture. The disaggregated base station 201 architecture may include one or more central units (CUs) 211 that can communicate directly with a core network 223 via a backhaul link, or indirectly with the core network 223 through one or more disaggregated base station units (such as a Near-Real Time (Near-RT) RAN Intelligent Controller (RIC) 227 via an E2 link, or a Non-Real Time (Non-RT) RIC 217 associated with a Service Management and Orchestration (SMO) Framework 207, or both). A CU 211 may communicate with one or more distributed units (DUs) 231 via respective midhaul links, such as an F1 interface. The DUs 231 may communicate with one or more radio units (RUs) 241 via respective fronthaul links. The RUs 241 may communicate with respective UEs 221 via one or more RF access links. In some implementations, the UE 221 may be simultaneously served by multiple RUs 241.

Each of the units, i.e., the CUS 211, the DUs 231, the RUs 241, as well as the Near-RT RICs 227, the Non-RT RICs 217 and the SMO Framework 207, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 211 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 211. The CU 211 may be configured to handle user plane functionality (i.e., Central Unit-User Plane (CU-UP)), control plane functionality (i.e., Central Unit-Control Plane (CU-CP)), or a combination thereof. In some implementations, the CU 211 can be logically split into one or more CU-UP units and one or more CU-CP units. The CU-UP unit can communicate bidirectionally with the CU-CP unit via an interface, such as the E1 interface when implemented in an O-RAN configuration. The CU 211 can be implemented to communicate with the DU 231, as necessary, for network control and signaling.

The DU 231 may correspond to a logical unit that includes one or more base station functions to control the operation of one or more RUs 241. In some aspects, the DU 231 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 231 may further host one or more low PHY layers. Each layer (or module) can be implemented with an interface configured to communicate signals with other layers (and modules) hosted by the DU 231, or with the control functions hosted by the CU 211.

Lower-layer functionality can be implemented by one or more RUs 241. In some deployments, an RU 241, controlled by a DU 231, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 241 can be implemented to handle over the air (OTA) communication with one or more UEs 221. In some implementations, real-time and non-real-time aspects of control and user plane communication with the RU(s) 241 can be controlled by the corresponding DU 231. In some scenarios, this configuration can enable the DU(s) 231 and the CU 211 to be implemented in a cloud-based RAN architecture, such as a vRAN architecture.

The SMO Framework 207 may be configured to support RAN deployment and provisioning of non-virtualized and virtualized network elements. For non-virtualized network elements, the SMO Framework 207 may be configured to support the deployment of dedicated physical resources for RAN coverage requirements which may be managed via an operations and maintenance interface (such as an O1 interface). For virtualized network elements, the SMO Framework 207 may be configured to interact with a cloud computing platform (such as an open cloud (O-Cloud) 291) to perform network element life cycle management (such as to instantiate virtualized network elements) via a cloud computing platform interface (such as an O2 interface). Such virtualized network elements can include, but are not limited to, CUs 211, DUs 231, RUs 241 and Near-RT RICs 227. In some implementations, the SMO Framework 207 can communicate with a hardware aspect of a 4G RAN, such as an open eNB (O-eNB) 213, via an O1 interface. Additionally, in some implementations, the SMO Framework 207 can communicate directly with one or more RUs 241 via an O1 interface. The SMO Framework 207 also may include a Non-RT RIC 217 configured to support functionality of the SMO Framework 207.

The Non-RT RIC 217 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 227. The Non-RT RIC 217 may be coupled to or communicate with (such as via an A1 interface) the Near-RT RIC 227. The Near-RT RIC 227 may be configured to include a logical function that enables near-real-time control and optimization of RAN elements and resources via data collection and actions over an interface (such as via an E2 interface) connecting one or more CUs 211, one or more DUs 231, or both, as well as an O-eNB 213, with the Near-RT RIC 227.

In some implementations, to generate AI/ML models to be deployed in the Near-RT RIC 227, the Non-RT RIC 217 may receive parameters or external enrichment information from external servers. Such information may be utilized by the Near-RT RIC 227 and may be received at the SMO Framework 207 or the Non-RT RIC 217 from non-network data sources or from network functions. In some examples, the Non-RT RIC 217 or the Near-RT RIC 227 may be configured to tune RAN behavior or performance. For example, the Non-RT RIC 217 may monitor long-term trends and patterns for performance and employ AI/ML models to perform corrective actions through the SMO Framework 207 (such as reconfiguration via O1) or via creation of RAN management policies (such as A1 policies).

Figure 3:
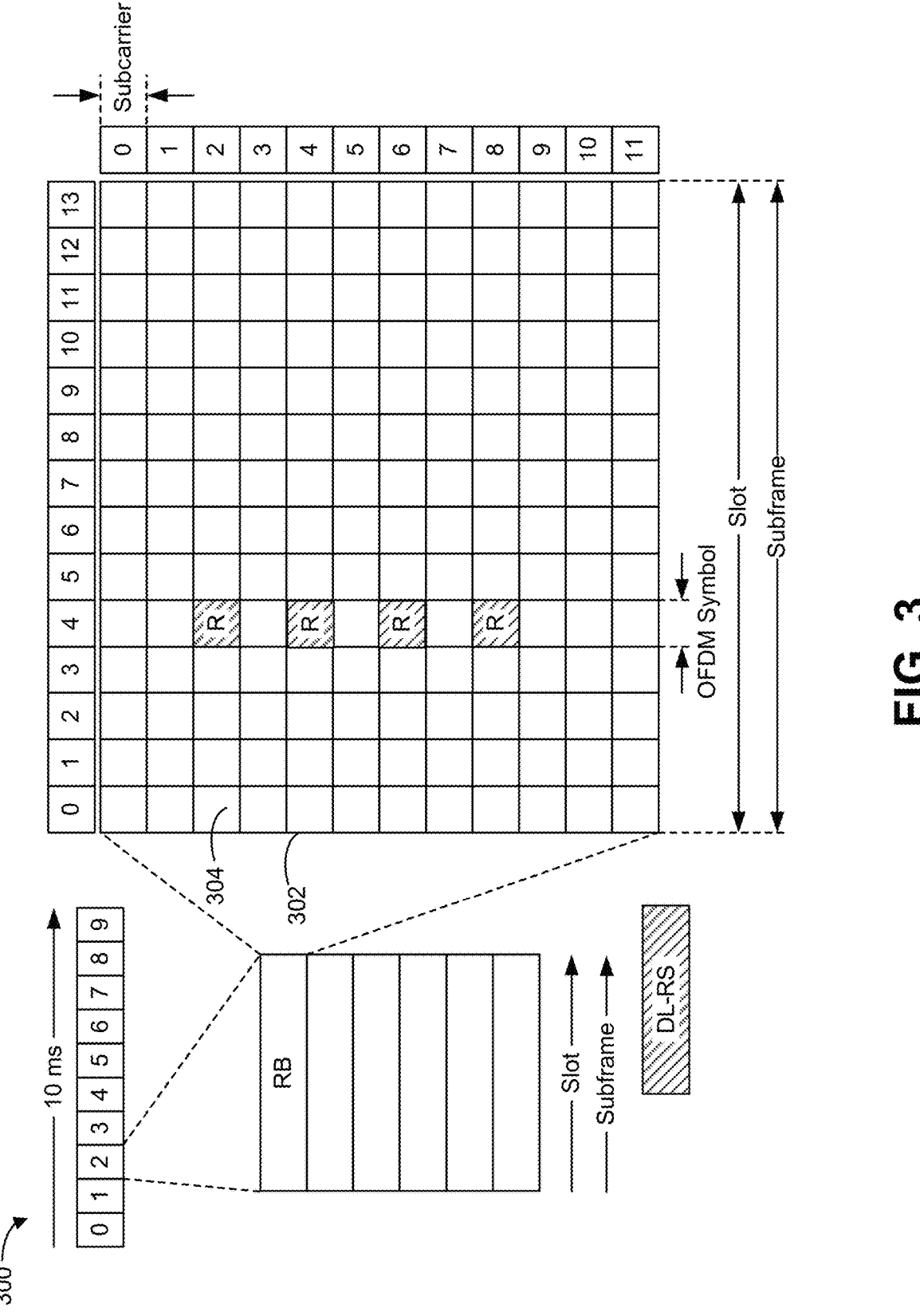
FIG. 3 is a diagram illustrating an example of a frame structure, which may be employed by the disclosed systems and techniques for RIS aided NTN UE positioning, in accordance with some aspects of the present disclosure.

Various radio frame structures may be used to support downlink, uplink, and sidelink transmissions between network nodes (e.g., base stations and UEs). FIG. 3 is a diagram 300 illustrating an example of a frame structure, which may be employed by the disclosed systems and techniques for RIS aided NTN UE positioning. Other wireless communications technologies may have different frame structures and/or different channels.

NR (and LTE) utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal fast Fourier transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies (u). For example, subcarrier spacing (SCS) of 15 kHz, 30 kHz, 60 kHz, 120 kHz, and 240 kHz or greater may be available. Table 1 provided below lists some various parameters for different NR numerologies.

TABLE 1

| | SCS (kHz) | Symbols/ Sot | Slots/ Sub- frame | Slots/ Frame | Slot Dur- ation (ms) | Symbol Dur- ation (μs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In one example, a numerology of 15 kHz is used. Thus, in the time domain, a 10 millisecond (ms) frame is divided into 10 equally sized subframes of 1 ms each, and each subframe includes one time slot. In FIG. 3, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. FIG. 3 illustrates an example of a resource block (RB) 302. Data or information for communications and/or positioning may be included in one or more RBs 302. The RB 302 is arranged with the time domain on the horizontal (or x-) axis and the frequency domain on the vertical (or y-) axis. As shown, the RB 302 may be 180 kilohertz (kHz) wide in frequency and one slot long in time (with a slot being 1 milliseconds (ms) in time). In some cases, the slot may include fourteen symbols (e.g., in a slot configuration 0). The RB 302 includes twelve subcarriers (along the y-axis) and fourteen symbols (along the x-axis).

An intersection of a symbol and subcarrier can be referred to as a resource element (RE) 304 or tone. The RB 302 of FIG. 3 includes multiple REs, including the resource element (RE) 304. For instance, a RE 304 is 1 subcarrier×1 symbol (e.g., OFDM symbol), and is the smallest discrete part of the subframe. A RE 304 includes a single complex value representing data from a physical channel or signal. The number of bits carried by each RE 304 depends on the modulation scheme.

In some aspects, some REs 304 can be used to transmit downlink reference (pilot) signals (DL-RS). The DL-RS can include Positioning Reference Signal (PRS), Tracking Reference Signal (TRS), Phase Tracking Reference Signal (PTRS), Channel State Information Reference Signal (CSI-RS), Demodulation Reference Signal (DMRS), Primary Synchronization Signal (PSS), Secondary Synchronization Signal (SSS), etc. The resource grid if FIG. 3 illustrates exemplary locations of REs 304 used to transmit DL-RS (labeled "R").

Figure 4:
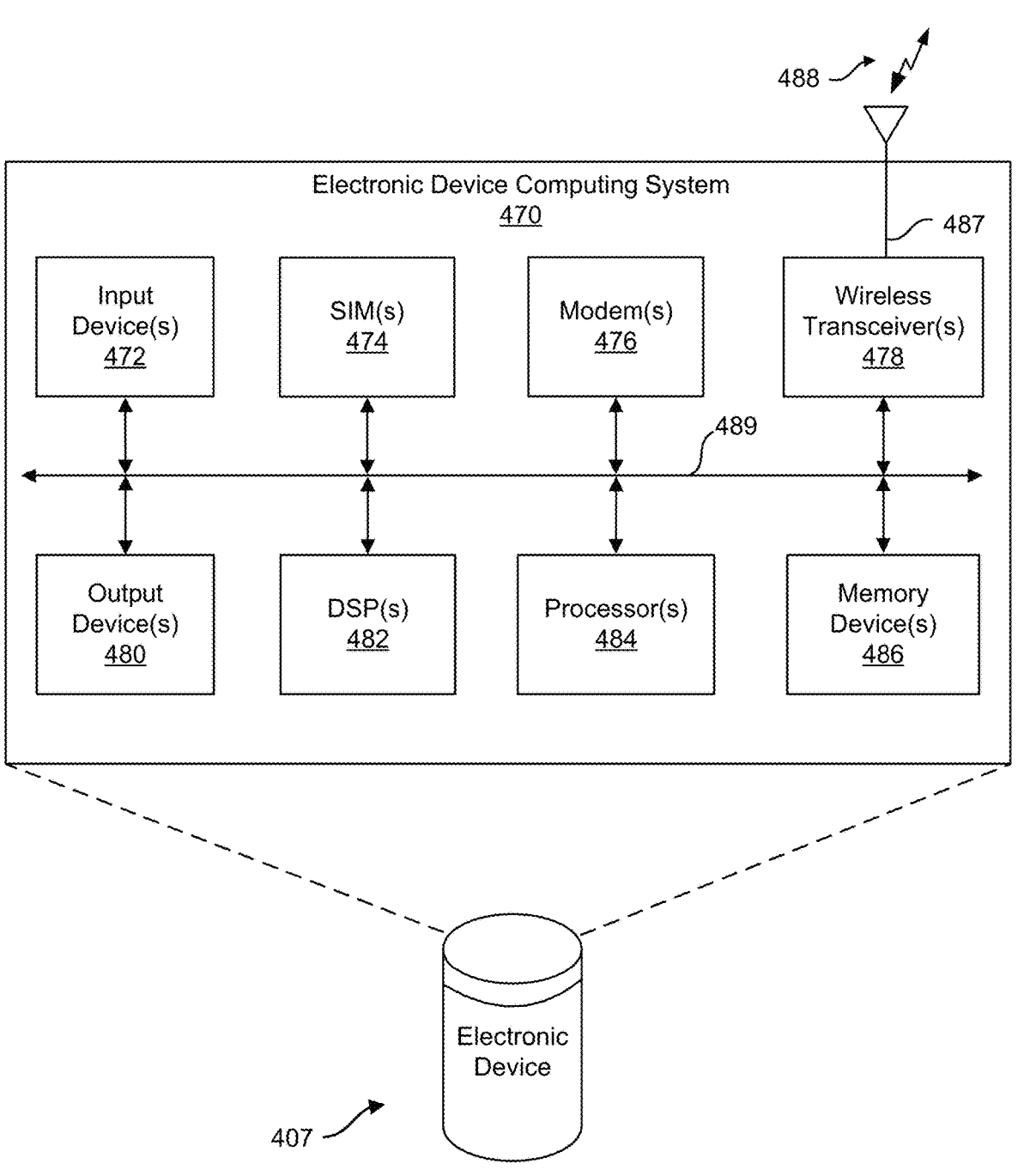
FIG. 4 is a block diagram illustrating an example of a computing system of an electronic device that may be employed by the disclosed systems and techniques for RIS aided NTN UE positioning, in accordance with some aspects of the present disclosure.

FIG. 4 is a block diagram illustrating an example of a computing system 470 of an electronic device 407, which may be employed by the disclosed systems and techniques for RIS aided NTN UE positioning. The electronic device 407 is an example of a device that can include hardware and software for the purpose of connecting and exchanging data with other devices and systems using a communications network (e.g., a $3^{rd}$ Generation Partnership network, such as a $5^{th}$ Generation (5G)/New Radio (NR) network, a $4^{th}$ Generation (4G)/Long Term Evolution (LTE) network, a WiFi network, or other communications network). For example, the electronic device 407 can include, or be a part of, a mobile device (e.g., a mobile telephone), a wearable device (e.g., a network-connected or smart watch), an extended reality device (e.g., a virtual reality (VR) device, an augmented reality (AR) device, or a mixed reality (MR) device), a personal computer, a laptop computer, a tablet computer, an Internet-of-Things (IoT) device, a wireless access point, a router, a vehicle or component of a vehicle, a server computer, a robotics device, and/or other device used by a user to communicate over a wireless communications network. In some cases, the device 407 can be referred to as user equipment (UE), such as when referring to a device configured to communicate using 5G/NR. 4G/LTE, or other telecommunication standard. In some cases, the device can be referred to as a station (STA), such as when referring to a device configured to communicate using the Wi-Fi standard.

The computing system 470 includes software and hardware components that can be electrically or communicatively coupled via a bus 489 (or may otherwise be in communication, as appropriate). For example, the computing system 470 includes one or more processors 484. The one or more processors 484 can include one or more CPUs, ASICS, FPGAs, APs, GPUs, VPUs, NSPs, microcontrollers, dedicated hardware, any combination thereof, and/or other processing device/s and/or system/s. The bus 489 can be used by the one or more processors 484 to communicate between cores and/or with the one or more memory devices 486.

The computing system 470 may also include one or more memory devices 486, one or more digital signal processors (DSPs) 482, one or more subscriber identity modules (SIMs) 474, one or more modems 476, one or more wireless transceivers 478, one or more antennas 487, one or more input devices 472 (e.g., a camera, a mouse, a keyboard, a touch sensitive screen, a touch pad, a keypad, a microphone or a microphone array, and/or the like), and one or more output devices 480 (e.g., a display, a speaker, a printer, and/or the like).

The one or more wireless transceivers 478 can receive wireless signals (e.g., signal 488) via antenna 487 from one or more other devices, such as other user devices, network devices (e.g., base stations such as evolved Node Bs (eNBs) and/or gNodeBs (gNBs), WiFi access points (APs) such as routers, range extenders or the like, etc.), cloud networks, and/or the like. In some examples, the computing system 470 can include multiple antennas or an antenna array that can facilitate simultaneous transmit and receive functionality. Antenna 487 can be an omnidirectional antenna such that RF signals can be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 478 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 488 into a baseband or intermediate frequency and can convert the RF signals to the digital domain.

In some cases, the computing system 470 can include a coding-decoding device (or CODEC) configured to encode and/or decode data transmitted and/or received using the one or more wireless transceivers 478. In some cases, the computing system 470 can include an encryption-decryption device or component configured to encrypt and/or decrypt data (e.g., according to the Advanced Encryption Standard (AES) and/or Data Encryption Standard (DES) standard) transmitted and/or received by the one or more wireless transceivers 478.

The one or more SIMs 474 can each securely store an international mobile subscriber identity (IMSI) number and related key assigned to the user of the electronic device 407. The IMSI and key can be used to identify and authenticate the subscriber when accessing a network provided by a network service provider or operator associated with the one or more SIMs 474. The one or more modems 476 can modulate one or more signals to encode information for transmission using the one or more wireless transceivers 478. The one or more modems 476 can also demodulate signals received by the one or more wireless transceivers 478 in order to decode the transmitted information. In some examples, the one or more modems 476 can include a WiFi modem, a 4G (or LTE) modem, a 5G (or NR) modem, and/or other types of modems. The one or more modems 476 and the one or more wireless transceivers 478 can be used for communicating data for the one or more SIMs 474.

The computing system 470 can also include (and/or be in communication with) one or more non-transitory machine-readable storage media or storage devices (e.g., one or more memory devices 486), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 486 and executed by the one or more processor(s) 484 and/or the one or more DSPs 482. The computing system 470 can also include software elements (e.g., located within the one or more memory devices 486), including, for example, an operating system, device drivers, executable libraries, and/or other code, such as one or more application programs, which may comprise computer programs implementing the functions provided by various aspects, and/or may be designed to implement methods and/or configure systems, as described herein.

In some aspects, the electronic device 407 can include means for performing operations described herein. The means can include one or more of the components of the computing system 470. For example, the means for performing operations described herein may include one or more of input device(s) 472, SIM(s) 474, modems(s) 476, wireless transceiver(s) 478, output device(s) 480, DSP(s) 482, processors 484, memory device(s) 486, and/or antenna(s) 487.

In some aspects, the electronic device 407 can include means for RIS aided NTN UE positioning. In some examples, any or all of these means can include the one or more wireless transceivers 478, the one or more modems 476, the one or more processors 484, the one or more DSPs 482, the one or more memory devices 486, any combination thereof, or other component(s) of the electronic device 407.

As previously mentioned, RISs (e.g., RIS 530 of FIG. 5) are traditionally used for communications. According to aspects described herein, systems and techniques are described for using RISs to assist in positioning in wireless communication systems (e.g., cellular systems). RIS-assisted positioning requires a higher accuracy (e.g., higher precision) of the RIS position than needed for RIS-assisted communication.

Figure 5:
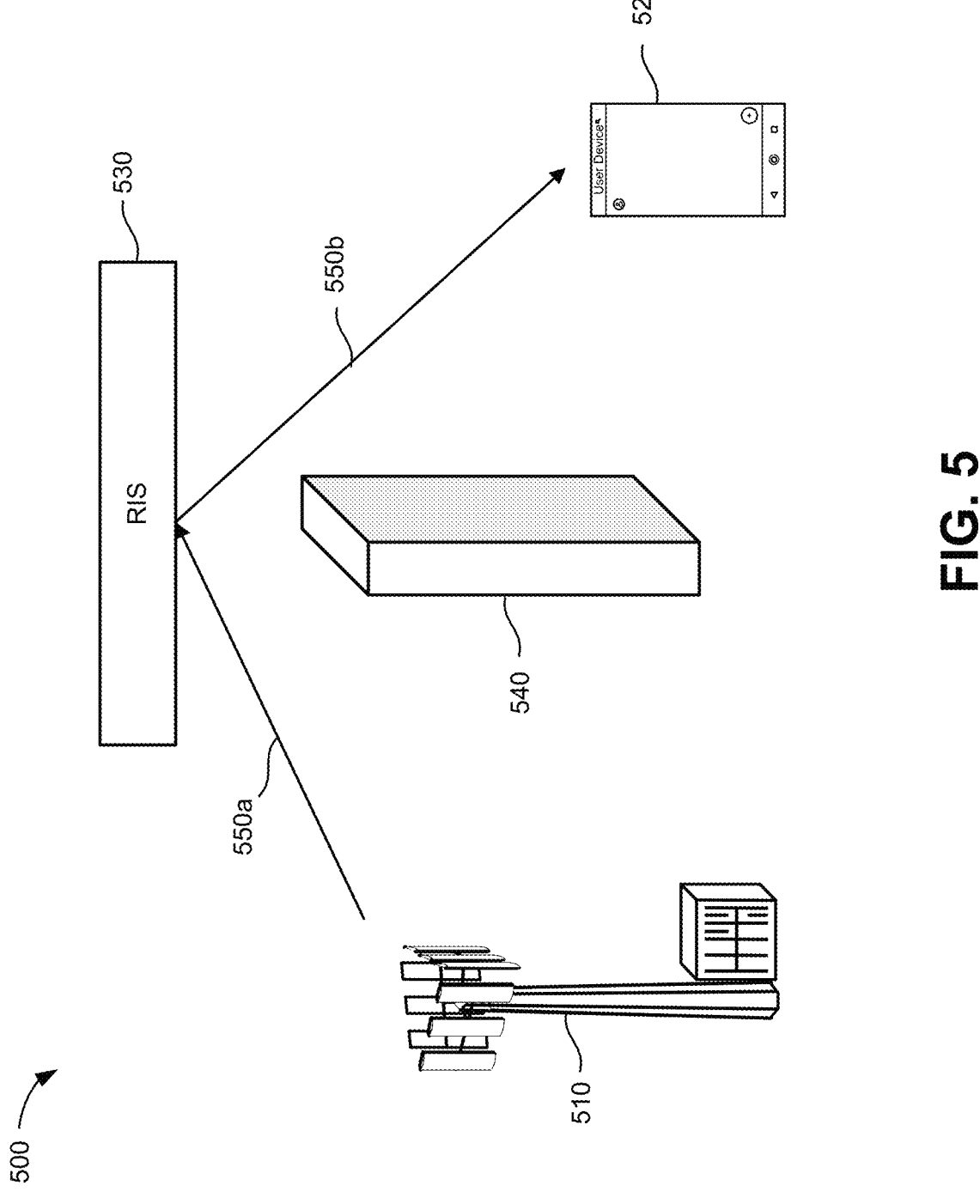
FIG. 5 is a diagram illustrating an example of a system for performing RIS-assisted positioning, in accordance with some aspects of the present disclosure.

FIG. 5 is a diagram illustrating an example of a system 500 for performing RIS-assisted positioning. In FIG. 5, the system 500 is shown to include a network device 520 in the form of a UE that may be operating as a positioning receiver to position (locate) itself. Also shown is a network device 510 in the form of a base station (e.g., gNB or a portion of a gNB, such as a CU, DU, RU, Near-RT RIC, Non-RT RIC, etc.) that may be operating as a positioning transmitter. The system 500 also includes a RIS 530. In some cases, an obstruction 540 (e.g., in the form of a building) may be obstructing the line of sight (LOS) from the network device 510 (e.g., gNB) to the network device 520 (e.g., UE).

The system 500 may include more or less network devices, than as shown in FIG. 5. In addition, the system 500 may include different types of network devices (e.g., vehicles and/or satellites) than as shown in FIG. 5. In one or more examples, the network devices 520 (e.g., UE) and 510 (e.g., gNB) may be equipped with heterogeneous capability, which may include, but is not limited to, 4G/5G cellular connectivity, GPS capability, camera capability, radar capability, and/or LIDAR capability. The network devices 520, 510 may be capable of performing wireless communications with each other (e.g., via the RIS 530) using communications signals.

The RIS 530 may passively operate as a relay by reflecting signals (e.g., positioning signals and/or communication signals) radiated from one network device (e.g., network device 510 in the form of a gNB) in a direction towards another network device (e.g., network device 520 in the form of a UE). For example, during operation of the system 500 for RIS-assisted positioning, since there is an obstruction 540 (e.g., building) located within the LOS between the network device 510 (e.g., gNB) and the network device 520 (e.g., UE), the network device 510 (e.g., gNB) may transmit a positioning signal (e.g., signal 550a) towards the RIS 530. The positioning signal (e.g., signal 550a) can reflect off of the RIS 530 to produce a reflection positioning signal (e.g., signal 550b). Elements of the RIS 530 (e.g., meta-elements) can cause the reflection positioning signal (e.g., signal 550b) to be radiated in a direction towards the network device 520 (e.g., UE), which can then receive the reflection positioning signal (e.g., signal 550b).

After the network device 520 (e.g., UE) receives the reflection positioning signal (e.g., signal 550b), the network device 520 (e.g., UE) can obtain measurements (e.g., Doppler, RTT, TOA, and/or TDOA measurements) of the reflection positioning signal (e.g., signal 550b). At least one processor (e.g., processor 1510 of FIG. 15) of the network device 520 (e.g., UE) may then determine or compute the positioning information (e.g., speed, location, distance, movement, heading, size, etc.) for itself by using the measurements (e.g., Doppler, RTT, TOA, and/or TDOA measurements) from the received reflection positioning signal 550*b*.

As previously mentioned, various different types of systems, such as terrestrial network (TN) and non-terrestrial network (NTN) systems, may employ RISs to assist in positioning (e.g., RIS-based positioning for UE positioning). TN systems are systems that rely solely upon a physical infrastructure built on the ground (e.g., a cellular network including base stations). NTN systems are systems that utilize some ground-based technologies (e.g., a cellular network) as well as aerial devices (e.g., satellites). For example, NTN systems may include, but are not limited to, one or more terrestrial terminals (e.g., a UE, such as a smartphone), one or more airborne or space devices, one or more service links between terrestrial and airborne/space devices, and one or more feeder links that connect the NTN to a TN. The airborne or space devices may include satellites, unmanned aerial vehicles (UAVs), and/or high-altitude platform systems (HAPS), which have a higher altitude than UAVs, but have a lower altitude than satellites.

Figure 6:
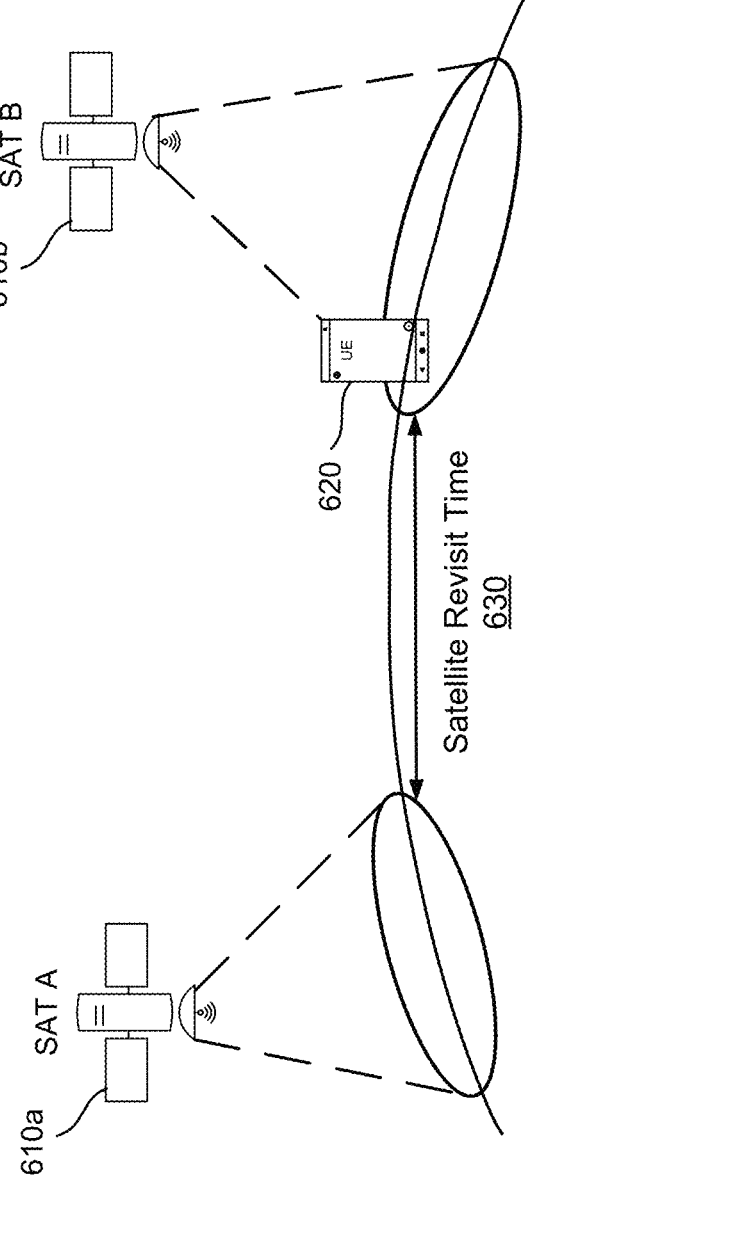
FIG. 6 is a diagram illustrating an example of an NTN system with discontinuous coverage, in accordance with some aspects of the present disclosure.

In NTN systems, discontinuous coverage of a UE may occur. For example, radio coverage may not be continuous due to a sparse number of satellites deployed within the NTN system. FIG. 6 shows an example of discontinuous coverage within an NTN system. In particular, FIG. 6 is a diagram illustrating an example of an NTN system 600 with discontinuous coverage, where the NTN system 600 is shown to include two satellites 610*a* (also referred to as satellite A or "SAT A"), 610*b* (also referred to as satellite B or "SAT B"), and a UE 620 (e.g., in the form of a smart phone). FIG. 6 shows a snapshot in time of the coverage on earth from the beams of the satellites 610*a*, 610*b*. In FIG. 6, the UE 620 is shown to have coverage from a beam radiated from satellite 610*b* (SAT B).

The discontinuous coverage area of the NTN system 600 is shown in FIG. 6 as the area on earth that is not covered by the beams from either of the satellites 610*a*, 610*b*, and is located between the coverage areas of the beams of the satellites 610*a*, 610*b*. As time passes, the satellites 610*a*, 610*b* are sweeping from left to right across the surface of the earth. The discontinuous coverage area shown in the snapshot of FIG. 6 will have coverage from the beam of satellite 610*a* (SAT A) after a satellite revisit time 630 has passed.

In some cases, satellite assistance information may be used by a UE for predicting a coverage discontinuity. For example, a SIByy can be used to broadcast the satellite assistance information to a UE. The SIByy can include mean values of the orbital parameters for up to N number of neighboring satellites, for example where N=4 satellites is a baseline. For a quasi-earth fixed cell, the one or more satellite start times may also broadcasted within the SIByy. The SIByy can further include beam information (e.g., a beam footprint reference point on the ground and a satellite beam coverage radius). A dedicated RRC signal and/or AS/NAS interactions can also be utilized for broadcasting the satellite assistance information. When the UE is located in a discontinuous coverage scenario, the UE may not be required to perform any idle task. In some cases, timers can be implemented in the UE for the UE to log measurements at certain times and/or time intervals.

A RIS is an artificial structure with engineered EM properties, which can collect wireless signals from one or more transmitters and passively beamform the signals into one or more beams radiated towards one or more desired receivers. In cellular systems, the transmitters and the receivers may each be in the form of a base station (e.g., gNB) or a UE. In some scenarios, RISs can be employed to extend the coverage area of cellular systems (e.g., 5G cellular systems) while having a negligible power consumption. In cellular systems, RISs can operate as a near passive devices that can reflect impinging waves to one or more desired directions, where the one or more reflection directions may be controlled by a base station (e.g., gNB).

Figure 7:
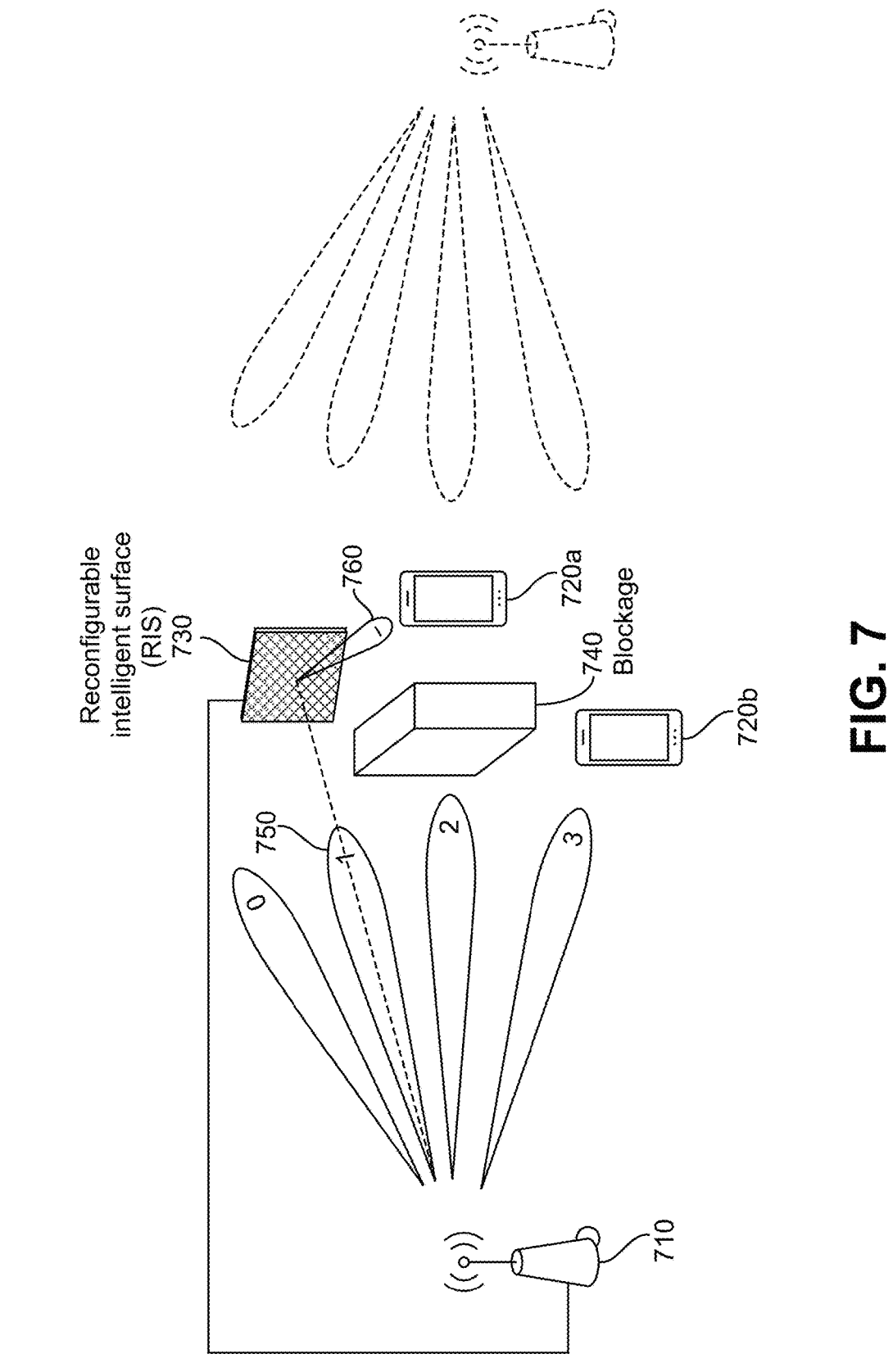
FIG. 7 is a diagram illustrating an example of a system employing a RIS to overcome a blockage in the environment, in accordance with some aspects of the present disclosure.

FIG. 7 shows an example of a RIS being employed to enhance coverage by overcoming a blockage in positioning. In particular, FIG. 7 is a diagram illustrating an example of a system 700 employing a RIS 730 to overcome a blockage 740 in the environment. In FIG. 7, the system 700 is shown to include a base station 710 (e.g., a network device, such as a gNB), UEs 720*a*, 720*b* (e.g., a network device, in the form of a smart phone), a RIS 730, and a blockage 740. During operation for positioning, the base station 710 can radiate positioning signals in beams 750 (e.g., beam 0, beam 1, beam 2, beam 3) in various different directions for positioning the UEs 720*a*, 720*b*. The base station 710 can also control the reflection direction of the RIS 730 such that elements of the RIS are configured to reflect signals in a direction towards the UE 720*a* for positioning of the UE 720*a*. As such, when beam 1 750 is radiated onto the RIS 730, elements of the RIS reflect the beam 1 750 to generate a reflection beam 760 radiated in a direction towards the UE 720*a* for positioning of the UE 720*a*.

In one or more examples, a RIS may not have angle reciprocity. For non-angle reciprocity, there is non-angle reciprocity between an incident angle $\theta_{inc}$ of the RIS and a reflection angle $\theta_{ref}$ of the RIS, such that a forward propagation of a signal reflected off of the RIS is not the same as a reverse propagation of a signal reflection off of the RIS.

Figure 8:
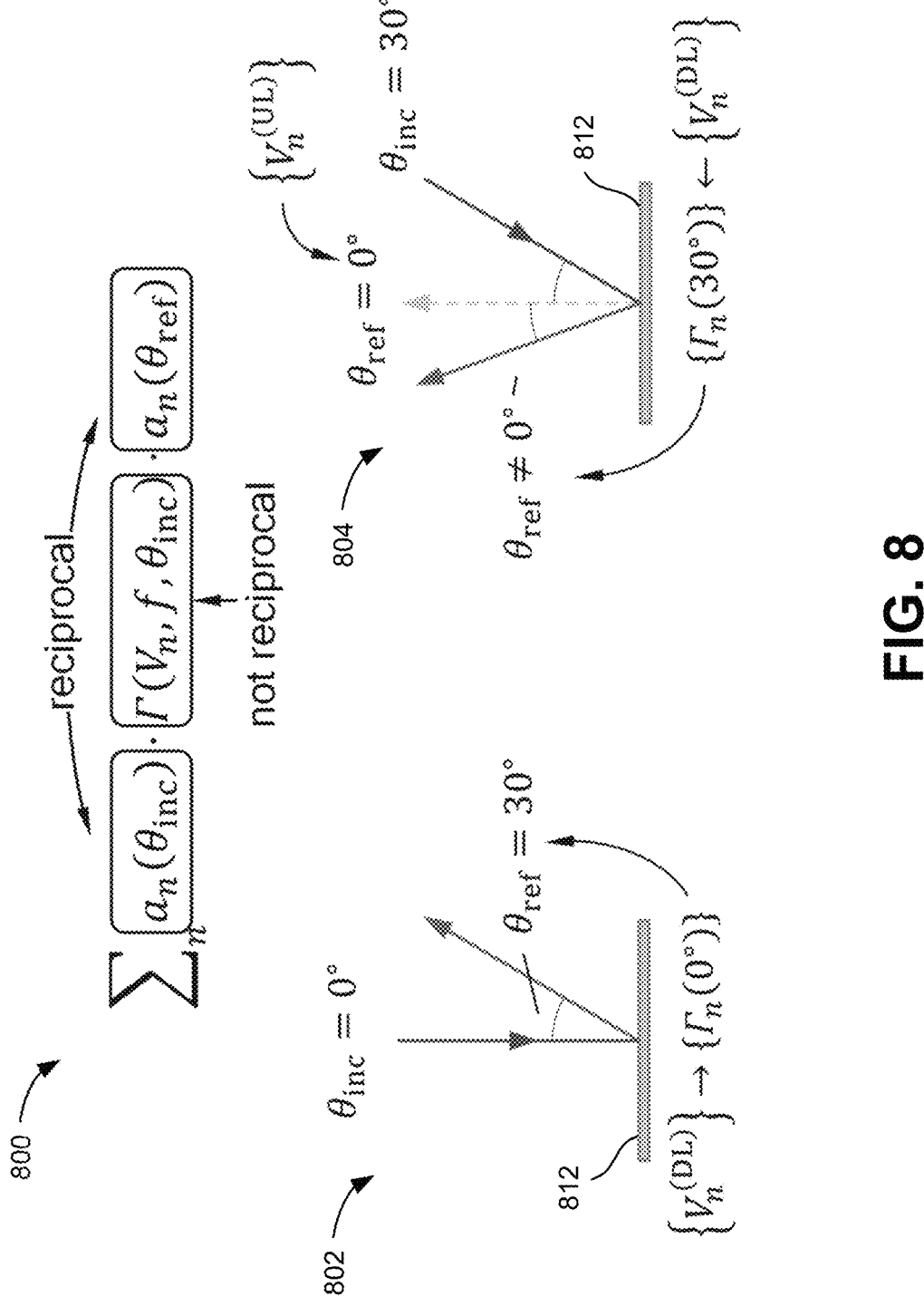
FIG. 8 is a diagram illustrating RIS angle non-reciprocity, in accordance with some aspects of the present disclosure.

FIG. 8 is a diagram illustrating RIS angle non-reciprocity. In particular, FIG. 8 includes a formula 800 for beamforming by a RIS, where an is the reflection coefficient for the RIS, $\theta_{inc}$ is the incident angle for the RIS, $\theta_{ref}$ is the reflection angle for the RIS, $\Gamma$ is the phase of the RIS. $V_n$ is the control voltage for the RIS, and f is the carrier frequency of the RIS.

FIG. 8 further includes reflection diagrams 802 and 804, which are shown to each include the same RIS 812. Reflection diagram 802 illustrates an example of a forward reflection off of the RIS 812, and reflection diagram 804 illustrates an example of a reverse reflection off of the RIS 812. In reflection diagram 802, with a zero degrees incident angle, a control voltage $$V_n^{(DL)}$$

for the downlink (DL) applied to the RIS 812 will cause the RIS 812 to have a phase of zero degrees, which will generate a reflection at a reflection angle of thirty degrees. In reflection diagram 804, with a thirty degrees incident angle, the same control voltage $$V_n^{(DL)}$$

applied to the RIS 812 will cause the RIS 812 to have a phase of thirty degrees, which will generate a reflection at a reflection angle not equal to zero degrees. As such, when the same control voltage (e.g., $$V_n^{(DL)})$$

is applied to the RIS 812 for both the forward reflection and the reverse reflection, the RIS 812 will not have angle reciprocity (e.g., the RIS 812 will have angle non-reciprocity). Therefore, for a RIS to have angle reciprocity, a pair of control voltage sets are needed, such as:

$$\{V_n^{(DL)}\} \text{ for } \theta_{inc} \to \theta_{ref}, \text{ and } \{V_n^{(UL)}\} \text{ for } \theta_{ref} \to \theta_{inc}.$$

Figure 9:
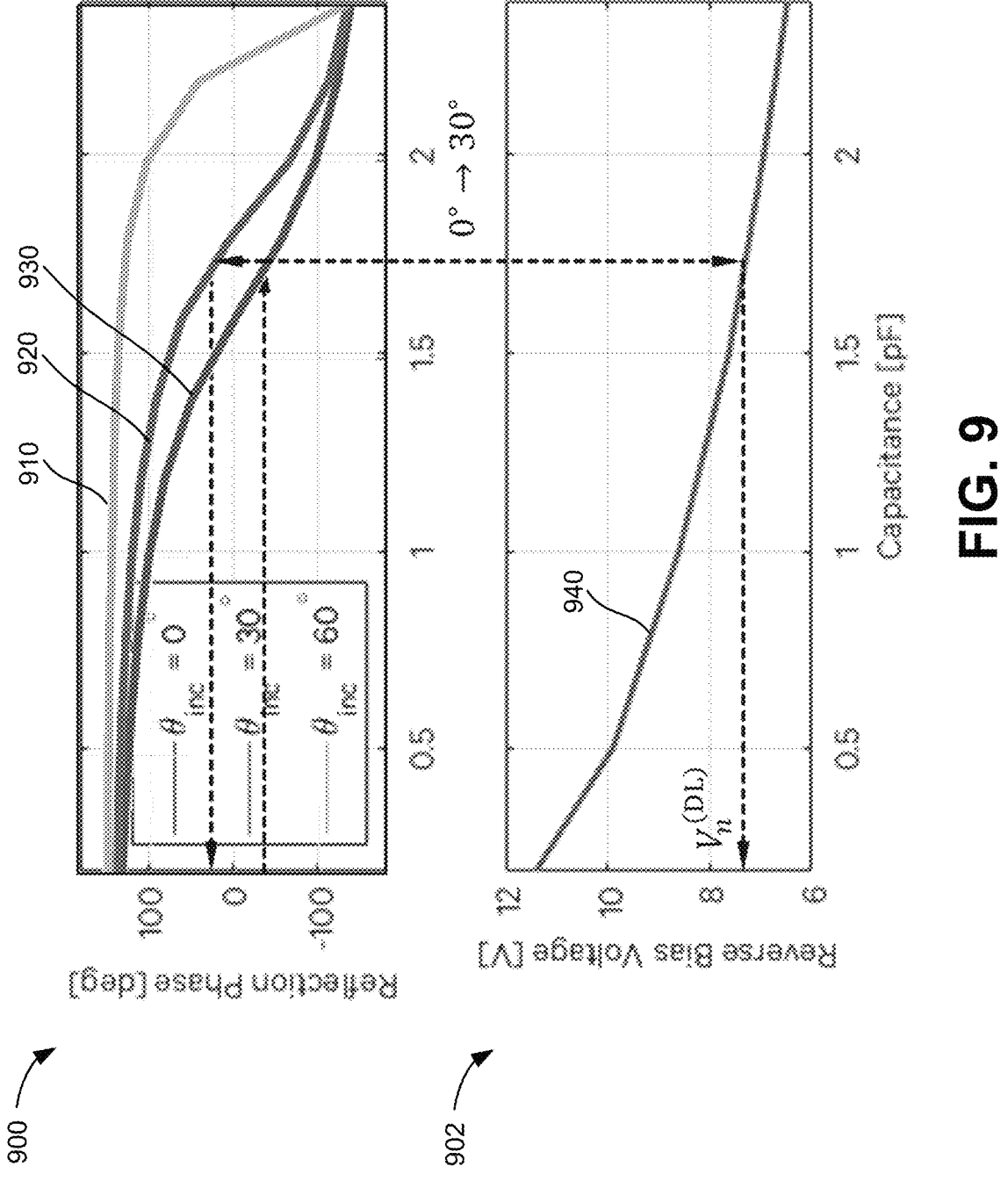
FIG. 9 is a diagram illustrating an example of a RIS control voltage corresponding to reflection phases, in accordance with some aspects of the present disclosure.

FIG. 9 is a diagram illustrating an example of a RIS control voltage corresponding to reflection phases. In particular FIG. 9 includes graphs 900, 902. For graph 900, the x-axis represents capacitance in picofarads (pF), and the y-axis represents the reflection phase $\Gamma$ in degrees. Graph 900 is shown to include curve 910 (for an incident angle of zero degrees), curve 920 (for an incident angle of thirty degrees), and curve 930 (for an incident angle of sixty degrees).

For graph 902, the x-axis represents capacitance in pF, and the y-axis represents the reverse bias voltage (e.g., control voltage) in volts. In graph 902, the curve 940 is for an incident angle of zero degrees. The control voltage of $$V_n^{(DL)}$$

is shown to map to the curves 920 and 930 of graph 900. As such, when a control voltage of $V_n^{(DL)}$ is applied to the RIS, with an incident angle of thirty degrees (for curve 920), the phase of the RIS will be approximately twenty-five degrees. When a control voltage of $V_n^{(DL)}$ is applied to the RIS, with an incident angle of zero degrees (for curve 930), the phase of the RIS will be approximately negative twenty-five degrees.

As previously mentioned, in NTN systems, UEs, such as RedCap UEs and/or eRedCap UEs, can have discontinuous coverage (e.g., a UE may be under a coverage hole). In LEO satellite-based UE positioning, the satellite visibility can greatly limit the positioning accuracy of the UE. In many LEO systems, the UE may only be able to observe one or two satellites at a time at most locations. Discontinuous coverage and dynamic PRS availability may result in unnecessary UE power consumption. As such, employing a RIS for NTN UE positioning to extend the coverage area to reduce discontinuous coverage can be useful.

In one or more aspects, systems and techniques provide solutions for RIS aided NTN UE positioning. These solutions can employ one or more RISs to enhance NTN cell coverage to ensure a consistent positioning service experience. For a UE without the use of GNSS, the positioning service may be even more critical, as it may impact the communication operations. In one or more examples, one or more RISs may be employed to serve as an additional anchor(s) to enhance UE positioning (e.g., especially for use with satellite constellations that provide limited satellite visibility at the UE).

In one or more aspects, enhancements are provided for RIS aided NTN UE positioning. NR PRS is a periodical RS. In one or more examples, each PRS can be associated with a transmission reception point (TRP) identification (ID). In one or more examples, for RIS aided UE positioning, a network (e.g., network entity, such as a network server or a location server) can dynamically update the assistance data (e.g., satellite assistance data) for the RIS aided NTN UE positioning. For example, the network can indicate in the assistance data the re-use of the same PRS configured for the UE (for the RIS aided UE positioning), or can indicate in the assistance data the transmission of a new PRS for the RIS aided UE positioning.

In one or more examples, the network can indicate, in the assistance data, watermark information for the RIS reflected PRS. The watermark information can allow for the UE to be able to differentiate between PRSs directly transmitted to the UE from the satellite and PRSs transmitted to the UE from the satellite via (e.g., reflected off of) a RIS. In some examples, the watermark may be a RIS specific RIS on-off pattern, or may be a RIS specific phase. In one or more examples, the RIS on-off pattern may only be effective when the UE is located out of the coverage of a satellite. In some examples, the assistance data (e.g., which may include watermark information, a RIS on-off pattern, and/or a RIS specific phase) may allow for the UE to be able to differentiate a PRS directly transmitted from the satellite to the UE and a PRS transmitted from the satellite to the UE via (e.g., reflected off of) a RIS. In one or more examples, the network can indicate which PRS (e.g., PRS ID) is associated with which specific watermark information (e.g., watermark ID). As such, there can be a mapping between the PRS ID and the watermark ID. In some examples, the UE can associate the corresponding watermark ID to the PRS measurement, when the UE reports the PRS measurement to the network.

In one or more aspects, the network may configure a timer (e.g., for reducing UE power consumption) for the UE to switch from performing a legacy PRS search (e.g., searching for PRSs directly transmitted by the satellite to the UE) to performing a new PRS search (e.g., searching for PRSs transmitted by the satellite to the UE via a RIS). In some examples, the network can configure the UE to apply a watermark to a received PRS, when decoding the received PRS.

For example, to reduce the power consumption of the UE, when the UE receives assistance data regarding a RIS reflected PRS, the UE can receive a timer in the assistance data to guide the UE regarding when the UE should switch from the reception of legacy PRSs (e.g., PRSs directly transmitted by the satellite to the UE) to the reception of new PRSs (e.g., PRSs transmitted by the satellite to the UE via a RIS). Since the network knows the location of the UE, the network can predict when the UE will not be able to receive PRSs transmitted directly from a satellite. The timer can indicate to the UE for the UE to start to search for new PRSs at a time when the UE no longer has satellite coverage and, as such, the UE will no longer be able to detect the legacy PRSs directly transmitted from a satellite.

In one or more aspects, the network can configure a new quasi-colocation (QCL) configuration between SSBs and PRSs to aid UE receive (Rx) beam selection for RIS aided positioning of the UE. During the reception of PRSs directly from a satellite, the UE (e.g., in the form of a smart phone or smart watch) may not need to select its Rx beam and, as such, the UE may not receive the QCL configuration between SSBs and PRSs. In one or more examples, for RIS aided NTN UE positioning, the UE may conduct Rx beam selection similar as the UE does for TN operation, as the RIS beam is similar to the TN base station beam. In some examples, the QCL configuration between SSBs and PRSs may be an implementation for the UE. A condition to trigger the QCL configuration may be when the UE is under the coverage of the RIS (e.g., coverage of one or more RIS beams). In one or more examples, when PRSs are directly transmitted to the UE from the satellite, the UE does not need to perform the Rx beam selection procedure for the UE to be able to receive the PRSs. The UE does not need to conduct Rx beam selection, until the UE is located within coverage by the RIS.

Figure 10:
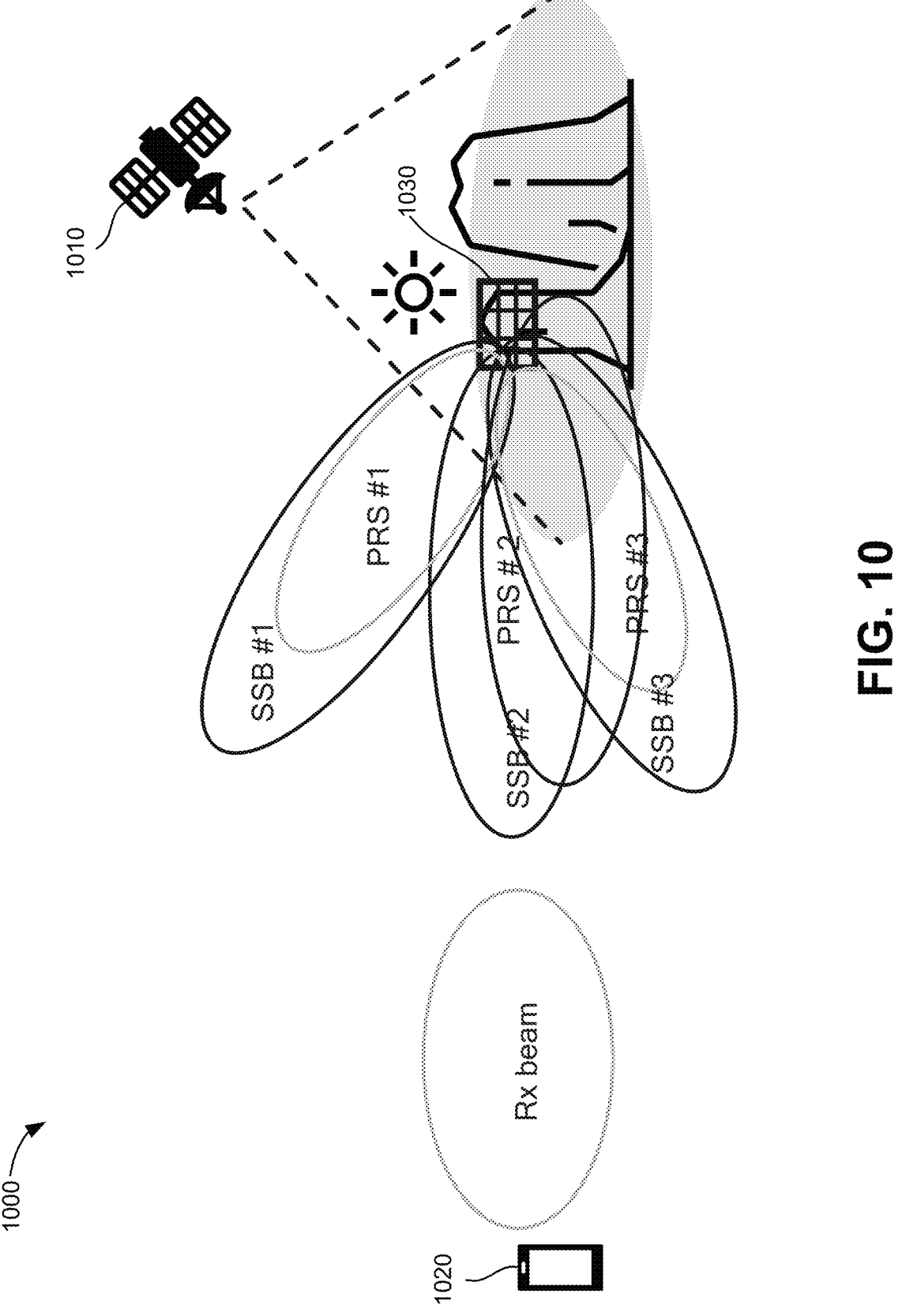
FIG. 10 is a diagram illustrating an example of a system for RIS aided NTN UE positioning, in accordance with some aspects of the present disclosure.

FIG. 10 shows an example of an NTN system 1000 including the transmission of SSB and PRS beams. In particular, FIG. 10 is a diagram illustrating an example of a system 1000 for RIS aided NTN UE positioning. In FIG. 10, the system 1000 is shown to include a satellite 1010, a UE 1020 (e.g., in the form of a smart phone), and a RIS 1030. During operation, the RIS 1030 is shown to be located within the coverage area (e.g., beam coverage area) of the satellite 1010. The satellite transmission beam radiated from the satellite 1010 is reflected off of the RIS 1030 to produce SSB beams (e.g., SSB 1, SSB 2, SSB 3) and PRS beams (e.g., PRS 1, PRS 2, PRS 3). In FIG. 10, since the UE 1020 is located within the coverage of the RIS 1030, but located outside of the coverage area of the satellite 1010, the UE 1020 may receive a QCL configuration between SSBs and PRSs and may conduct Rx beam selection for receiving the PRSs (e.g., PRS 2) reflected off of the RIS 1030, which can also be referred to as reflection positioning reference signals (reflection PRS).

In one or more aspects, when a UE is performing network-based UE positioning, based on the UE coarse location, the network can configure a list of potential RISs that can serve the UE for the positioning. However, the UE may not obtain measurements of the PRSs reflected by some of the RISs, as the UE may not be able to detect these PRSs. In one or more examples, the UE can explicitly indicate to the network that the UE will not obtain measurements of PRSs reflected by a RIS (or by a group of RISs) such that the network (e.g., a location server) will not wait (e.g., stall its positioning processing) for the UE to report measurements associated with these RISs, which can increase the latency of the positioning of the UE.

In one or more examples, in NTN UE positioning without the use of a RIS, angle-based positioning cannot be configured, due to the large distance between the satellite and the UE. However, in NTN UE positioning with the use of a RIS, when the UE is under the coverage of a RIS, AoD based positioning may be configured for the UE positioning. In some examples, the use of AoD based positioning when the UE is under RIS coverage may be a network implementation. The condition to trigger the AoD based positioning can be when the UE is located under the RIS coverage. AoA based positioning cannot be supported by most RISs, as RISs typically have a limited baseband capability. In AoD based positioning, the UE is only expected to measure the RSRP of the RIS reflected PRS.

In one or more examples, when UE is located at the edge of an NTN cell, the UE may still be able to measure the PRS directly transmitted by the satellite. However, the UE may be more sensitive to its UL capacity for its measurement report. When the UE is limited in UL transmission size (e.g., limited in PUCCH size) or the UE is operating in power saving mode, the UE can prioritize its PRS measurements. In one or more examples, the UE can decide which PRS measurements are to be reported with a high priority based on a number of minimum anchors (e.g., satellites and/or RISs) needed for an accurate positioning calculation, a geometric dilution of precision (GDOP) of the anchors, a signal quality of the measurements (e.g., RSRP measurements), and/or a level of reliability of the measurements. In one or more examples, the UE can explicitly indicate to the network that the UE will not report the remaining PRS measurements (e.g. PRS measurement without a high priority).

As previously mentioned, a RIS may not have angle reciprocity for DL and UL beams. In order to have RIS angle reciprocity for DL and UL beams, a pair of control voltages (also referred to as control voltage sets) can be applied, such as: $\{V_n^{(DL)}\}$ for $\theta_{inc} \rightarrow \theta_{ref}$, and $\{V_n^{(UL)}\}$ for $\theta_{ref} \rightarrow \theta_{inc}$.

In one or more aspects, in a TN system, the beams radiated between a base station (e.g., gNB) and a RIS may be fixed (e.g., well maintained) to obtain an optimum link quality. As such, each RIS UL reception beam can be fixed, and can be mapped to a specific pair of control voltage sets. A mismatch between RIS DL/UL beams (e.g., which can be fixed beams) and UE UL beams (e.g., which cannot be fixed beams, in most cases) can dramatically decrease the UL beam quality (e.g., SNR), especially when the UE is located within a blockage area (e.g., where the RIS is serving the UE because the UE is located behind a blockage). The RIS UL beam control voltage may be fixed, but the UE UL beams may not perfectly match the RIS UL reception beam.

Figure 11:
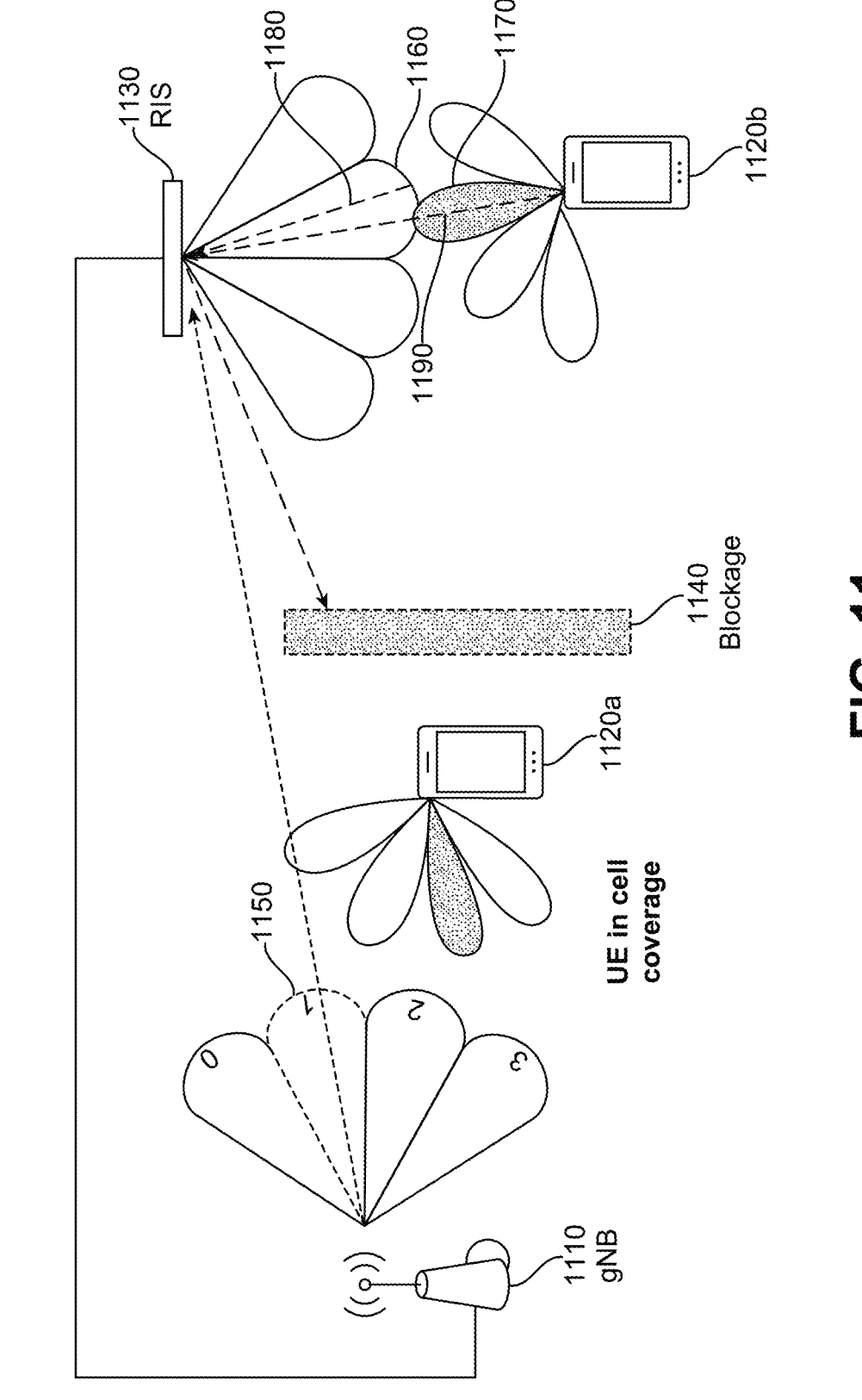
FIG. 11 is a diagram illustrating an example of a terrestrial network (TN) system with a fixed base station-RIS beam, in accordance with some aspects of the present disclosure.

FIG. 11 shows an example of a mismatch in a RIS UL reception beam and a UE UL beam for UE positioning. In particular, FIG. 11 is a diagram illustrating an example of a TN system 1100 with a fixed base station-RIS beam. In FIG. 11, the system 1100 is shown to include a base station 1110 (e.g., gNB), UEs 1120a, 1120b (e.g., each in the form of a smart phone), a RIS 1130, and a blockage 1140. During operation for positioning, the base station 1110 can radiate positioning signals in beams 1150 (e.g., beam 0, beam 1, beam 2, beam 3) in various different directions for positioning the UEs 1120a, 1120b. The base station 1110 may also control the reflection direction of the RIS 1130 such that elements of the RIS are configured to reflect signals in a direction towards the UE 1120b for positioning of the UE 1120b. As such, when beam 1 1150 is radiated onto the RIS 1130, elements of the RIS 1130 reflect the beam 1 1150 to generate a reflection beam 1180 (e.g., a RIS DL beam) radiated in a direction towards the UE 1120b for positioning of the UE 1120b. However, as shown in FIG. 11, the boresight 1180 of the reflection beam 1180 (e.g., RIS DL beam) is not aligned with the boresight 1190 of the UE UL beam 1170. Since the boresight 1180 of the reflection beam 1180 (e.g., RIS DL beam) is not aligned with the boresight 1190 of the UE UL beam 1170, the signal quality (e.g., SNR) of the UE UL beam can be dramatically decreased, which can decrease the accuracy of the positioning of the UE 1120b.

Figure 12:
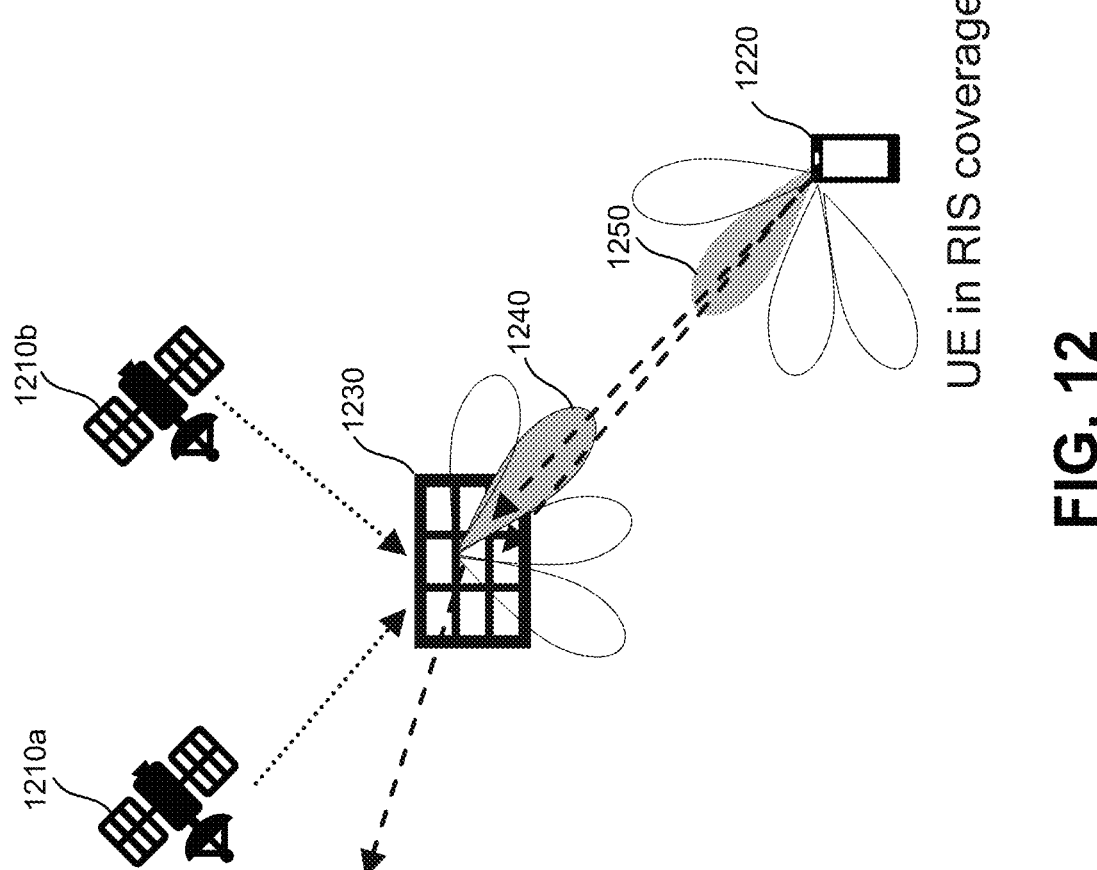
FIG. 12 is a diagram illustrating an example of an NTN system with dynamic satellite-RIS beam, in accordance with some aspects of the present disclosure.
Figure 12:

In an NTN system, since the beams between the satellite and the RIS are dynamically changing over time (e.g., as the satellite sweeps across the sky), beam adaptation for RIS aided NTN UE positioning can be used to provide for accurate positioning of a UE. FIG. 12 is a diagram illustrating an example of an NTN system 1200 with a dynamic satellite-RIS beam. In FIG. 12, the system 1200 is shown to include a satellite located in a first position 1210a, the same satellite located in a second position 1210b, a UE 1220 (e.g., a network device, in the form of a UE), and a RIS 1230. Over time, the satellite is sweeping left to right across earth from the first position 1210a in the sky to the second position 1210*b* in the sky. As the satellite moves across the sky, the incident angle of the beam transmitted from the satellite radiating onto the RIS 1230 is changing and, as such, with a constant voltage set applied to the RIS 1230, the reflection angle of the beam reflected from the RIS (e.g., RIS DL beam 1240) will also be changing. As such, the RIS DL beam 1240 and the UE UL beam 1250 will need to be aligned with each other dynamically for accurate positioning of the UE 1220.

In one or more aspects, network aided UE dynamic beam adaptation may be employed for beam adaptation for RIS aided NTN UE positioning. In a typical implementation, a limited number of pairs of control voltage sets may be configured for a RIS. In an NTN system, the satellite beam is sweeping over time, in which case the number of beam correspondences of the DL beam (e.g., of the RIS) and UL beam (e.g., of the UE) can be very large. In one or more examples, the network can calculate the best UL beam for the UE to choose (e.g., to align with the RIS DL beam), under the constraint of a limited number of pairs of control voltage sets configured for the RIS. The network may know, for a specific point in time, the location of the satellite and the location of the RIS as well as the control voltages applied to the RIS. By knowing this information, the network can determine (e.g., calculate) the optimum UE UL beam relative to the RIS DL beam. In some examples, the network can signal (e.g., report) to the UE, the optimum UE UL beam relative to the RIS DL beam. In some examples, the network can signal (e.g., report) to the UE, multiple sets of beams (e.g., each set including an optimum UE UL beam relative to a RIS DL beam) to be used over a duration of time.

In one or more examples, the network can signal (e.g., report) to the UE, RIS DL beam pattern information, which may include a group of RIS DL beam patterns with time stamps. These RIS DL beam patterns may be changing over time (e.g., which is different from the fixed beams in TN systems). In one or more examples, for UE based positioning, the UE can estimate its AoD, and can adjust its UL Tx beam to be aligned with an optimum UE UL beam relative to a specific RIS DL beam.

In one or more examples, for network-based positioning, the network can estimate the UE AoD. The network may report the AoD to the UE. With the AoD information, the UE can adjust its UL Tx beam accordingly to be aligned with an optimum UE UL beam relative to a specific RIS DL beam. In some examples, a network can signal (e.g., report) to the UE, the relative angle difference between the UE AoD and a specific RIS DL beam. The UE can adjust its UL Tx beam based on this relative angle difference information. In one or more examples, since the RIS DL beam pattern includes time stamps, the UE can adjust its UL beam for future transmissions (e.g., for receiving RIS DL beams in the future).

In one or more aspects, dynamic RIS voltage adaptation may be employed for beam adaptation for RIS aided NTN UE positioning. In one or more examples, if a RIS has some baseband capability, the RIS may receive information regarding the incident angle of the satellite beam radiated towards the RIS. In one or more examples, the RIS may conduct AoA estimation of the satellite beam. In some examples, the network can calculate the AoD between the satellite beam and the RIS, and then the network may signal (e.g., report) the AoD to the RIS.

In one or more examples, the RIS may fix the DL RIS beam (e.g., fix a direction of a reflection PRS reflected by the RIS) by dynamically changing its voltage pair (e.g., the voltage pair applied to the RIS). In some examples, the voltage pair applied to the RIS can fix the DL RIS beam and can dynamically change the UL RIS beam (e.g., in order to maintain optimum link quality between the RIS and the satellite in the NTN system). In one or more examples, with the AoD estimation of the UE, the UE can adjust its UL Tx beam to be aligned with an optimum DL RIS beam. In some examples, the UE can decide which DL RIS beam is optimum based on the UE's own measurements of the beams. AoD and RTT based positioning can be used to enable a single RIS based NTN UE positioning.

In a discontinuous coverage (e.g., discontinuous satellite coverage) scenario, PRSs are not always available from a UE perspective. The satellites in the NTN system may move (e.g., sweep across the sky such that they are) out of the field of the view of the UE. In some cases, the UE may still be located within the coverage of at least one RIS. In other cases, the UE may not be located within the coverage of any RIS. As such, the assistance data (e.g., Release 18 NTN assistance data), used by the UE to predict a discontinuous coverage, may not be sufficient for the RIS aided NTN UE positioning.

In one or more examples, UE power saving enhancements are provided. To conserve UE power, the network can explicitly indicate to the UE, the PRS availability. After receiving the PRS availability information from the network, the UE will no longer need to blindly detect whether the transmitted PRSs can reach the UE or whether the RIS is switched on or off for operation.

In one or more examples, for a connected UE, the indication of the PRS availability could be transmitted via RRC, downlink control information (DCI), and/or a medium access control-control element (MAC CE). In one or more examples, for a UE operating in an idle or inactive mode, the indication of the PRS availability may be included within the positioning assistance data in the SIB.

In one or more examples, for a UE operating in an idle or inactive mode, an early page indication (EPI)/paging physical downlink control channel (PDCCH) based indication of the PRS availability may be employed. For example, the network may further inform the UE of the availability of configured PRSs in L1 signaling (e.g., in EPI/paging PDCCH) to dynamically switch on or off the PRS transmission. If the high layer configuration of the PRS (e.g., the positioning assistance data) in the SIB update is infrequent, an indication of PRS availability in the SIB may not be sufficient to dynamically reflect the presence or absence of the PRS. If the EPI indicates the PRS availability, the paging PDCCH does not need to carry the information for the PRS availability. The PRS for idle or inactive UEs can be transmitted within a validity duration based on network configuration.

In one or more examples, reserved bits of DCI may be repurposed for the PRS indication. For these examples, the DCI can carry the DL assignment for the SIB. As a result, the UE can save some power for reduced PDCCH monitoring, including EPI.

Figure 13:
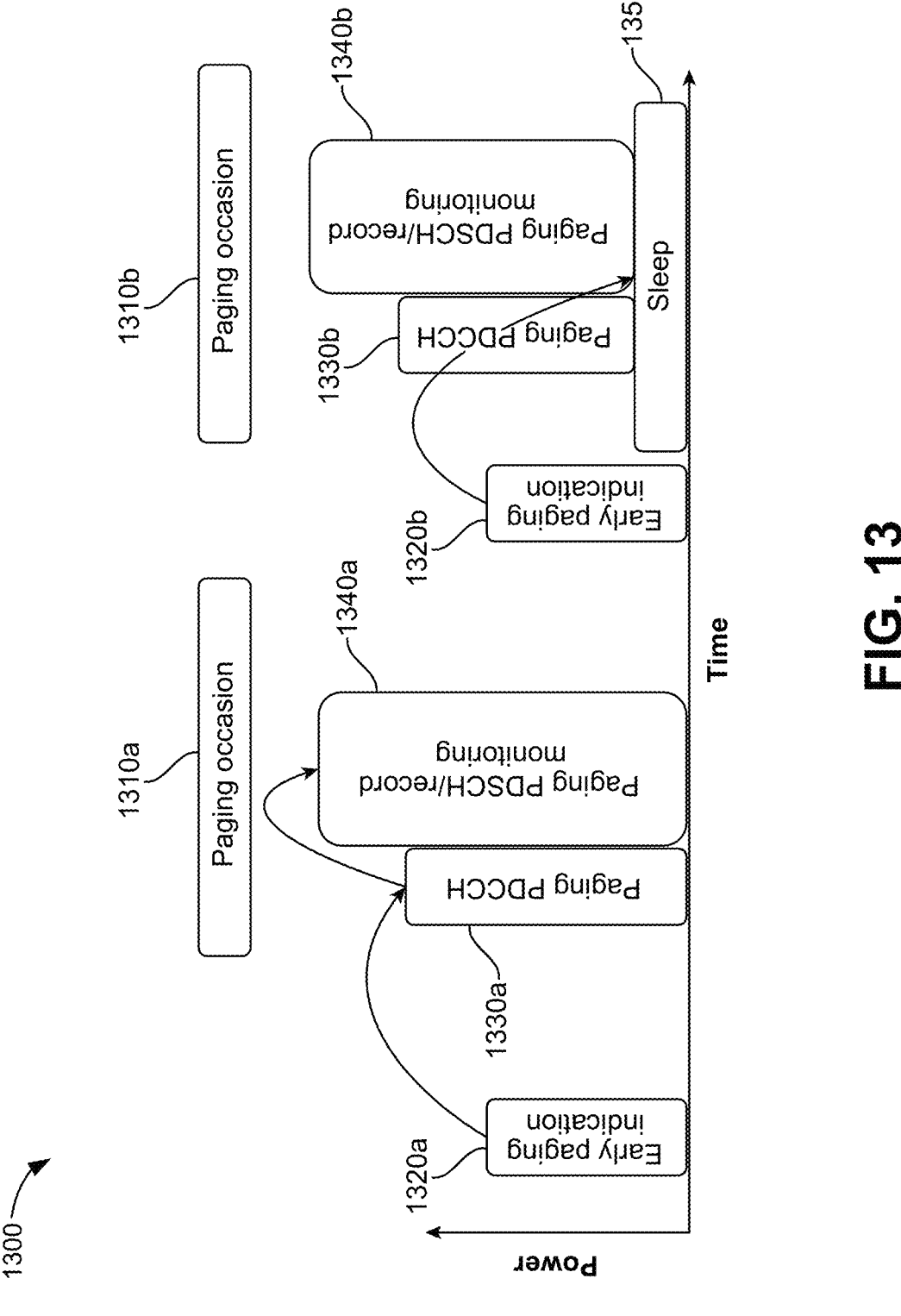
FIG. 13 is a diagram illustrating an example of power-optimized early paging indication, in accordance with some aspects of the present disclosure.

FIG. 13 shows an example of an EPI, which is a 3GPP power saving technique introduced in Release 17. In particular, FIG. 13 is a diagram illustrating an example of power-optimized EPI. In particular FIG. 13 shows a graph 1300 illustrating EPI. For the graph 1300, the x-axis represents time, and the y-axis represents power. In the graph 1300, early paging indications (EPIs) 1320*a*, 1320*b* and paging occasions (POs) 1310*a*, 1310*b* are shown. Each PO 1310*a*, 1310*b* is shown to include a paging PDCCH period 1330*a*. 1330*b*, and a paging physical downlink shared channel (PDSCH)/record monitoring period 1340*a*, 1340*b*.

For mobile terminated communications, UEs need to periodically monitor configured paging channels to detect upcoming traffic. As such, a set of periodic paging occasions (POs) (e.g., POs 1310a, 1310b) can be configured, where the idle/inactive UEs (e.g., UEs operating in an idle or inactive mode) can monitor various POs. A PO can be defined by a PDCCH search space (e.g., paging PDCCH period 1330a, 1330b) and an associated paging PDSCH record (e.g., paging PDSCH/record monitoring period 1340a, 1340b). That is, UEs can monitor the PDCCH search space of the configured PO. When there is a paging indication present, the UEs can receive and decode the paging record (PDSCH), and become aware of the listed identifiers of the UEs, which are actually paged. Accordingly, paged UEs can trigger a connection establishment procedure, while other UEs may transition back to a deep sleep state. A major challenge is that all idle/inactive UEs must monitor and decode the paging PDCCH and PDSCH, even though if they are not actually paged, which can consume unnecessary power of the non-paged UEs.

Release 17 introduced the control channel of an EPI (e.g., EPI 1320a, 1320b). The EPI implies a limited-sized downlink control information (DCI) search space or a sequence, transmitted from a base station (e.g., gNB) prior to each PO. Idle/inactive UEs can monitor the search space of the EPI, and upon detection of a EPI indication (e.g., EPI 1320a, 1320b), the UEs can monitor the next PO. Otherwise, the UEs can be in a deep sleep (e.g., sleep 1350) and skip detecting the PO. The achievable power saving gain is due to the more limited EPI search space, as compared to the actual paging PDCCH. As such, the EPI can reduce the number of unneeded PO decoding (e.g., reduce the number of paging false alarms, for UEs which are not paged).

The EPI DCI or sequence can be defined for a certain group of idle/inactive UEs. Particularly, idle/inactive UEs can be sub-grouped into several paging groups (e.g., by several introduced grouping means), and the EPI DCI can be scrambled in a group-specific manner. As such, when an idle/inactive UE calculates a wrong cyclic redundancy check (CRC) after decoding the EPI DCI with its own paging-group scrambling code, the idle/inactive UE can assume that the transmitted EPI is meant for one or more of the other paging groups, and can accordingly skip the PO, which can lead to a further reduction in the number of paging false alarms.

Figure 14:
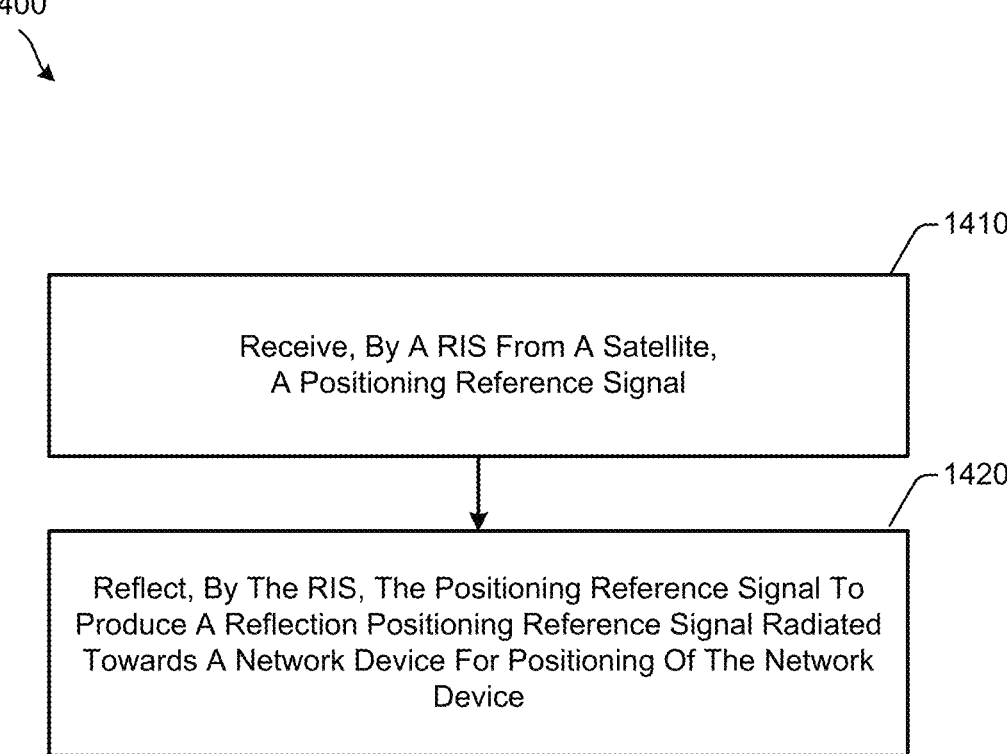
FIG. 14 is a flow chart illustrating an example of a process for wireless communications at a network device based on methods for RIS aided NTN UE positioning, in accordance with some aspects of the present disclosure.

FIG. 14 is a flow chart illustrating an example of a process 1400 for wireless communications utilizing methods for RIS aided NTN UE positioning. The process 1400 can be performed by a RIS (e.g., RIS 1030 of FIG. 10 and/or RIS 1230 of FIG. 12) or by a component or system (e.g., a chipset) of the RIS. The operations of the process 1400 may be implemented as software components that are executed and run on one or more processors (e.g., the processor 1510 of FIG. 15 and/or other processor(s)). Further, the transmission and reception of signals by the wireless communications device in the process 1400 may be enabled, for example, by one or more antennas (e.g., the antenna 487 of FIG. 4, and/or other antenna(s)) and/or one or more transceivers such as one or more wireless transceivers (e.g., the wireless transceiver(s) 478 of FIG. 4, the communication interface 1540 of FIG. 15, and/or other transceiver(s)).

At block 1410, the RIS can receive, from a satellite (e.g., satellite 1010 of FIG. 10 and/or the satellite in FIG. 12, which is shown in a first position 1210a and a second position 1210b), a positioning reference signal. At block 1420, the RIS can reflect the positioning reference signal to produce a reflection positioning reference signal (e.g., a reflection PRS 2 in FIG. 10 and/or RIS DL beam 1240 in FIG. 12) radiated towards a network device for positioning of the network device. In one or more examples, the network device may be a UE (e.g., UE 1020 of FIG. 10 and/or UE 1220 in FIG. 12). In some examples, the satellite (e.g., satellite 1010 of FIG. 10) may be an LEO satellite. In one or more examples, the positioning reference signal may be a PRS (e.g., PRS 2 in FIG. 10).

In some cases, the RIS can receive, from a network entity, a data signal comprising assistance data. In some examples, the RIS can reflect the data signal to produce a reflection data signal radiated towards the network device (e.g., UE 1020 of FIG. 10 and/or UE 1220 of FIG. 12). In some aspects, the network entity may be a network server (e.g., location server 172 of FIG. 1). In some cases, the data signal may be a SIB signal. In one or more examples, the assistance data can include a watermark ID for the reflection positioning reference signal, a PRS ID associated with the watermark ID, a timer for the network device to switch between positioning detection modes, a QCL between SSBs and/or PRSs for the positioning of the network device (e.g., UE 1020 of FIG. 10 and/or UE 1220 of FIG. 12), any combination thereof, and/or other data. In some cases, the watermark ID can be a RIS on-off pattern or a RIS specific phase. In some aspects, the positioning detection modes can include a first positioning detection mode of detecting positioning signals directly transmitted from the satellite (e.g., satellite 1010 of FIG. 10) to the network device (e.g., UE 1020 of FIG. 10 and/or UE 1220 of FIG. 12), and a second positioning detection mode of detecting positioning signals transmitted from the satellite (e.g., satellite 1010 of FIG. 10) to the network device (e.g., UE 1020 of FIG. 10 and/or UE 1220 of FIG. 12) via the RIS (e.g., RIS 1030 of FIG. 10 and/or RIS 1230 of FIG. 12).

In some aspects, the RIS can receive, from a network entity (e.g., a network server, such as location server 172 of FIG. 1), a beam adaptation signal including beam adaptation information. In one or more examples, the RIS (e.g., RIS 1030 of FIG. 10 and/or RIS 1230 of FIG. 12) can reflect the beam adaptation signal to produce a reflection beam adaptation signal radiated towards the network device (e.g., UE 1020 of FIG. 10 and/or UE 1220 of FIG. 12). In some cases, the beam adaptation information can include RIS DL positioning beam pattern information with time stamps. In one or more examples, the RIS DL positioning beam pattern can include the reflection positioning reference signal. In one or more examples, the beam adaptation information can include one or more sets of beams. In some cases, each of the one or more sets of beams can include a network device UL positioning beam to align with a RIS DL positioning beam. In one or more examples, the beam adaptation information can include an AoD for a network device UL positioning beam to align with the reflection positioning reference signal. In some cases, the beam adaptation information can include a relative angle difference between an AoD for a network device UL positioning beam to align with the reflection positioning reference signal.

In some aspects, a pair of voltages can be dynamically applied to the RIS (e.g., RIS 1030 of FIG. 10 and/or RIS 1230 of FIG. 12) to fix a direction of the reflection positioning reference signal to align with a network device UL positioning beam. For instance, as previously described, a pair of control voltage sets can be used, such as: $\{V_n^{(DL)}\}$ for $\theta_{inc} \rightarrow \theta_{ref}$, and $\{V_n^{(UL)}\}$ for $\theta_{ref} \rightarrow \theta_{inc}$ to have RIS angle reciprocity for DL and UL beams.

In some cases, the RIS can receive, from the network entity (e.g., a network server, such as location server 172 of FIG. 1), a positioning availability signal comprising PRS availability information. In one or more examples, the RIS (e.g., RIS 1030 of FIG. 10 and/or RIS 1230 of FIG. 12) can reflect the positioning availability signal to produce a reflection positioning availability signal radiated towards the network device (e.g., UE 1020 of FIG. 10 and/or UE 1220 of FIG. 12). In some aspects, the positioning availability signal may be transmitted via one of RRC, DCI, or a MAC CE, when the network device is operating in a connected mode. In one or more examples, the positioning availability signal may be a SIB signal and the PRS availability information may be within assistance data in the SIB signal, when the network device (e.g., UE 1020 of FIG. 10 and/or UE 1220 of FIG. 12) is operating in an idle mode or an inactive mode. In some cases, the positioning availability signal may be transmitted via L1 signaling using an EPI/PDCCH (e.g., EPI 1320*a* and PDCCH period 1330*a* of FIG. 13), when the network device (e.g., UE 1020 of FIG. 10 and/or UE 1220 of FIG. 12) is operating in an idle mode or an inactive mode. In some examples, the positioning availability signal may be transmitted via DCI and the PRS availability information may be within repurposed bits of the DCI, when the network device (e.g., UE 1020 of FIG. 10 and/or UE 1220 of FIG. 12) is operating in an idle mode or an inactive mode.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1400 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1400 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 15:
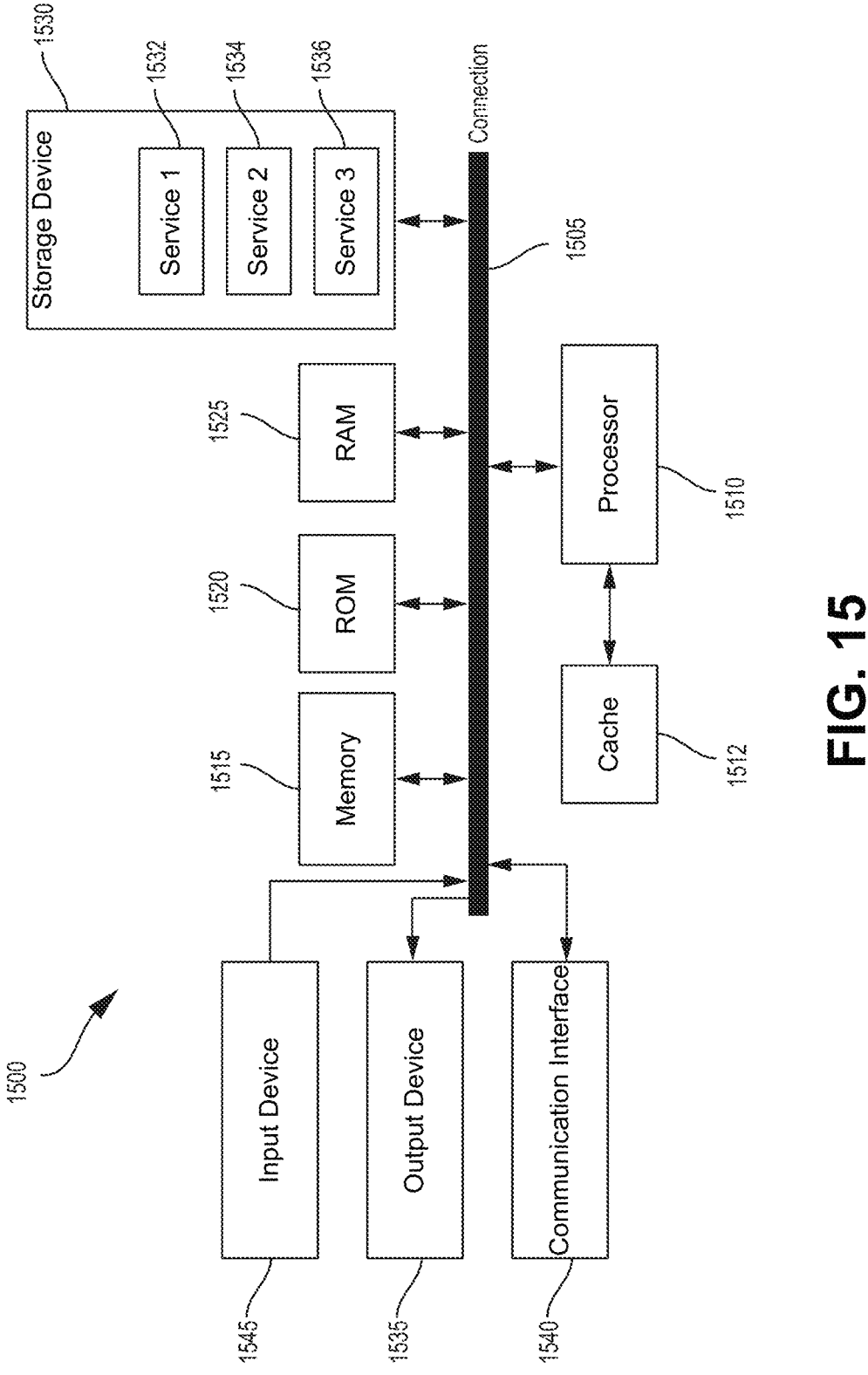
FIG. 15 is a block diagram illustrating an example of a computing system, which may be employed by the disclosed systems and techniques for RIS aided NTN UE positioning, in accordance with some aspects of the present disclosure.

FIG. 15 is a block diagram illustrating an example of a computing system 1500, which may be employed by the disclosed systems and techniques for RIS aided NTN UE positioning. In particular, FIG. 15 illustrates an example of computing system 1500, which can be, for example, any computing device making up internal computing system, a remote computing system, a camera, or any component thereof in which the components of the system are in communication with each other using connection 1505. Connection 1505 can be a physical connection using a bus, or a direct connection into processor 1510, such as in a chipset architecture. Connection 1505 can also be a virtual connection, networked connection, or logical connection.

In some aspects, computing system 1500 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1500 includes at least one processing unit (CPU or processor) 1510 and connection 1505 that communicatively couples various system components including system memory 1515, such as read-only memory (ROM) 1520 and random access memory (RAM) 1525 to processor 1510. Computing system 1500 can include a cache 1512 of high-speed memory connected directly with, in close proximity to, or integrated as part of processor 1510.

Processor 1510 can include any general purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms. In some instances, multimodal systems can enable a user to provide multiple types of input/output to communicate with computing system 1500.

Computing system 1500 can include communications interface 1540, which can generally govern and manage the user input and system output. The communications interface 1540 may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1540 may also include one or more range sensors (e.g., LIDAR sensors, laser range finders, RF radars, ultrasonic sensors, infrared (IR) sensors, etc.) configured to collect data and provide measurements to processor 1510, whereby processor 1510 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1530 can include software services, servers, services, etc., that when the code that defines such software is executed by the processor 1510, it causes the system to perform a function. In some aspects, a hardware service that performs a particular function can include the software component stored in a computer-readable medium in connection with the necessary hardware components, such as processor 1510, connection 1505, output device 1535, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods, algorithms, and/or operations described above. The computer-readable data storage medium may form part of a computer program product, which may include packaging materials. The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communications interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Claim language or other language reciting "at least one processor configured to," "at least one processor being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Illustrative aspects of the disclosure include:

Aspect 1. A reconfigurable intelligent surface (RIS) for wireless communication, the RIS comprising: at least one transceiver configured to receive, from a satellite, a positioning reference signal; and at least one element configured to reflect the positioning reference signal to produce a reflection positioning reference signal radiated towards a network device for positioning of the network device.

Aspect 2. The RIS of Aspect 1, wherein the network device is user equipment (UE).

Aspect 3. The RIS of any one of Aspects 1 or 2, wherein the satellite is a low earth orbiting (LEO) satellite.

Aspect 4. The RIS of any one of Aspects 1 to 3, wherein the positioning reference signal is a positioning reference signal (PRS).

Aspect 5. The RIS of any one of Aspects 1 to 4, where: the at least one transceiver is configured to receive, from a network entity, a data signal comprising assistance data; and the at least one element is configured to reflect the data signal to produce a reflection data signal radiated towards the network device.

Aspect 6. The RIS of Aspect 5, wherein the network entity is a network server.

Aspect 7. The RIS of any one of Aspects 5 or 6, wherein the data signal is a system information block (SIB) signal.

Aspect 8. The RIS of any one of Aspects 5 to 7, wherein the assistance data comprises at least one of a watermark identification (ID) for the reflection positioning reference signal, a positioning reference signal (PRS) ID associated with the watermark ID, a timer for the network device to switch between positioning detection modes, or a quasi-colocation configuration (QCL) between synchronization signal blocks (SSBs) and positioning reference signals (PRSs) for the positioning of the network device.

Aspect 9. The RIS of Aspect 8, wherein the watermark ID is one of a RIS on-off pattern or a RIS specific phase.

Aspect 10. The RIS of any one of Aspects 8 or 9, wherein the positioning detection modes comprise a first positioning detection mode of detecting positioning signals directly transmitted from the satellite to the network device, and a second positioning detection mode of detecting positioning signals transmitted from the satellite to the network device via the RIS.

Aspect 11. The RIS of any one of Aspects 1 to 10, wherein: the at least one transceiver is configured to receive, from a network entity, a beam adaptation signal comprising beam adaptation information; and the at least one element is configured to reflect the beam adaptation signal to produce a reflection beam adaptation signal radiated towards the network device.

Aspect 12. The RIS of Aspect 11, wherein the beam adaptation information comprises RIS downlink (DL) positioning beam pattern information with time stamps, and wherein the RIS DL positioning beam pattern information comprises the reflection positioning reference signal.

Aspect 13. The RIS of any one of Aspects 11 or 12, wherein the beam adaptation information comprises one or more sets of beams, wherein each of the one or more sets of beams comprises a network device uplink (UL) positioning beam to align with a RIS downlink (DL) positioning beam.

Aspect 14. The RIS of any one of Aspects 11 to 13, wherein the beam adaptation information comprises an angle of departure (AoD) for a network device uplink (UL) positioning beam to align with the reflection positioning reference signal.

Aspect 15. The RIS of any one of Aspects 11 to 14, wherein the beam adaptation information comprises a relative angle difference between an angle of departure (AoD) for a network device uplink (UL) positioning beam to align with the reflection positioning reference signal.

Aspect 16. The RIS of any one of Aspects 1 to 15, further comprising at least one processor configured to dynamically apply, to the RIS, a pair of voltages to fix a direction of the reflection positioning reference signal to align with a network device uplink (UL) positioning beam.

Aspect 17. The RIS of any one of Aspects 1 to 16, wherein: the at least one transceiver is configured to receive, from a network entity, a positioning availability signal comprising positioning reference signal (PRS) availability information; and the at least one element is configured to reflect the positioning availability signal to produce a reflection positioning availability signal radiated towards the network device.

Aspect 18. The RIS of Aspect 17, wherein the at least one transceiver is configured to receive the positioning availability signal via one of radio resource control (RRC), downlink control information (DCI), or a medium access control-control element (MAC CE), when the network device is operating in a connected mode.

Aspect 19. The RIS of any one of Aspects 17 or 18, wherein the positioning availability signal is a system information block (SIB) signal and the PRS availability information is within assistance data in the SIB signal, when the network device is operating in one of an idle mode or an inactive mode.

Aspect 20. The RIS of any one of Aspects 17 to 19, wherein the at least one transceiver is configured to receive the positioning availability signal via L1 signaling using an early page indication (EPI)/paging physical downlink control channel (PDCCH), when the network device is operating in one of an idle mode or an inactive mode.

Aspect 21. The RIS of any one of Aspects 17 to 20, wherein the at least one transceiver is configured to receive the positioning availability signal via downlink control information (DCI) and the PRS availability information is within repurposed bits of the DCI, when the network device is operating in one of an idle mode or an inactive mode.

Aspect 22. A method of wireless communication performed at a reconfigurable intelligent surface (RIS), the method comprising: receiving, by the RIS from a satellite, a positioning reference signal; and reflecting, by the RIS, the positioning reference signal to produce a reflection positioning reference signal radiated towards a network device for positioning of the network device.

Aspect 23. The method of Aspect 22, wherein the network device is user equipment (UE).

Aspect 24. The method of any one of Aspects 22 or 23, wherein the satellite is a low earth orbiting (LEO) satellite.

Aspect 25. The method of any one of Aspects 22 to 24, wherein the positioning reference signal is a positioning reference signal (PRS).

Aspect 26. The method of any one of Aspects 22 to 25, further comprising: receiving, by the RIS from a network entity, a data signal comprising assistance data; and reflecting, by the RIS, the data signal to produce a reflection data signal radiated towards the network device.

Aspect 27. The method of Aspect 5, wherein the network entity is a network server.

Aspect 28. The method of any one of Aspects 26 or 27, wherein the data signal is a system information block (SIB) signal.

Aspect 29. The method of any one of Aspects 26 to 28, wherein the assistance data comprises at least one of a watermark identification (ID) for the reflection positioning reference signal, a positioning reference signal (PRS) ID associated with the watermark ID, a timer for the network device to switch between positioning detection modes, or a quasi-colocation configuration (QCL) between synchronization signal blocks (SSBs) and positioning reference signals (PRSs) for the positioning of the network device.

Aspect 30. The method of Aspect 29, wherein the watermark ID is one of a RIS on-off pattern or a RIS specific phase.

Aspect 31. The method of any one of Aspects 29 or 30, wherein the positioning detection modes comprise a first positioning detection mode of detecting positioning signals directly transmitted from the satellite to the network device, and a second positioning detection mode of detecting positioning signals transmitted from the satellite to the network device via the RIS.

Aspect 32. The method of any one of Aspects 22 to 31, further comprising: receiving, by the RIS from a network entity, a beam adaptation signal comprising beam adaptation information; and reflecting, by the RIS, the beam adaptation signal to produce a reflection beam adaptation signal radiated towards the network device.

Aspect 33. The method of Aspect 32, wherein the beam adaptation information comprises RIS downlink (DL) positioning beam pattern information with time stamps, and wherein the RIS DL positioning beam pattern information comprises the reflection positioning reference signal.

Aspect 34. The method of any one of Aspects 32 or 33, wherein the beam adaptation information comprises one or more sets of beams, wherein each of the one or more sets of beams comprises a network device uplink (UL) positioning beam to align with a RIS downlink (DL) positioning beam.

Aspect 35. The method of any one of Aspects 32 to 34, wherein the beam adaptation information comprises an angle of departure (AoD) for a network device uplink (UL) positioning beam to align with the reflection positioning reference signal.

Aspect 36. The method of any one of Aspects 32 to 35, wherein the beam adaptation information comprises a relative angle difference between an angle of departure (AoD) for a network device uplink (UL) positioning beam to align with the reflection positioning reference signal.

Aspect 37. The method of any one of Aspects 22 to 36, further comprising dynamically applying, to the RIS, a pair of voltages to fix a direction of the reflection positioning reference signal to align with a network device uplink (UL) positioning beam.

Aspect 38. The method of any one of Aspects 22 to 37, further comprising: receiving, by the RIS from a network entity, a positioning availability signal comprising positioning reference signal (PRS) availability information; and reflecting, by the RIS, the positioning availability signal to produce a reflection positioning availability signal radiated towards the network device.

Aspect 39. The method of Aspect 38, wherein the positioning availability signal is transmitted via one of radio resource control (RRC), downlink control information (DCI), or a medium access control-control element (MAC CE), when the network device is operating in a connected mode.

Aspect 40. The method of any one of Aspects 38 or 39, wherein the positioning availability signal is a system information block (SIB) signal and the PRS availability information is within assistance data in the SIB signal, when the network device is operating in one of an idle mode or an inactive mode.

Aspect 41. The method of any one of Aspects 38 to 40, wherein the positioning availability signal is transmitted via L1 signaling using an early page indication (EPI)/paging physical downlink control channel (PDCCH), when the network device is operating in one of an idle mode or an inactive mode.

Aspect 42. The method of any one of Aspects 38 to 41, wherein the positioning availability signal is transmitted via downlink control information (DCI) and the PRS availability information is within repurposed bits of the DCI, when the network device is operating in one of an idle mode or an inactive mode.

Aspect 43. A non-transitory computer-readable storage medium comprising instructions stored thereon which, when executed by at least one processor, causes the at least one processor to perform operations according to any one of Aspects 22 to 42.

Aspect 44. An apparatus for wireless communications, comprising one or more means for performing operations according to any one of Aspects 22 to 42.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. A reconfigurable intelligent surface (RIS) for wireless communication, the RIS comprising:

at least one transceiver configured to receive, from a satellite, a positioning reference signal; and at least one element configured to reflect the positioning reference signal to produce a reflection positioning reference signal radiated towards a network device for positioning of the network device, where the at least one transceiver is configured to receive, from a network entity, a data signal comprising assistance data, wherein the assistance data comprises at least one of a watermark identification (ID) for the reflection positioning reference signal, a positioning reference signal (PRS) ID associated with the watermark ID, a timer for the network device to switch between positioning detection modes, or a quasi-colocation configuration (QCL) between synchronization signal blocks (SSBs) and positioning reference signals (PRSs) for the positioning of the network device; and the at least one element is configured to reflect the data signal to produce a reflection data signal radiated towards the network device.

2. The RIS of claim 1, wherein the network device is user equipment (UE).

3. The RIS of claim 1, wherein the satellite is a low earth orbiting (LEO) satellite.

4. The RIS of claim 1, wherein the positioning reference signal is a positioning reference signal (PRS).

5. The RIS of claim 1, wherein the network entity is a network server.

6. The RIS of claim 1, wherein the data signal is a system information block (SIB) signal.

7. The RIS of claim 1, wherein the watermark ID is one of a RIS on-off pattern or a RIS specific phase.

8. The RIS of claim 1, wherein the positioning detection modes comprise a first positioning detection mode of detecting positioning signals directly transmitted from the satellite to the network device, and a second positioning detection mode of detecting positioning signals transmitted from the satellite to the network device via the RIS.

9. The RIS of claim 1, wherein:

the at least one transceiver is configured to receive, from a network entity, a beam adaptation signal comprising beam adaptation information; and the at least one element is configured to reflect the beam adaptation signal to produce a reflection beam adaptation signal radiated towards the network device.

10. The RIS of claim 9, wherein the beam adaptation information comprises RIS downlink (DL) positioning beam pattern information with time stamps, and wherein the RIS DL positioning beam pattern information comprises the reflection positioning reference signal.

11. The RIS of claim 9, wherein the beam adaptation information comprises one or more sets of beams, wherein each of the one or more sets of beams comprises a network device uplink (UL) positioning beam to align with a RIS downlink (DL) positioning beam.

12. The RIS of claim 9, wherein the beam adaptation information comprises an angle of departure (AoD) for a network device uplink (UL) positioning beam to align with the reflection positioning reference signal.

13. The RIS of claim 9, wherein the beam adaptation information comprises a relative angle difference between an angle of departure (AoD) for a network device uplink (UL) positioning beam to align with the reflection positioning reference signal.

14. The RIS of claim 1, further comprising at least one processor configured to dynamically apply, to the RIS, a pair of voltages to fix a direction of the reflection positioning reference signal to align with a network device uplink (UL) positioning beam.

15. The RIS of claim 1, wherein:

the at least one transceiver is configured to receive, from a network entity, a positioning availability signal comprising positioning reference signal (PRS) availability information; and the at least one element is configured to reflect the positioning availability signal to produce a reflection positioning availability signal radiated towards the network device.

16. The RIS of claim 15, wherein the at least one transceiver is configured to receive the positioning availability signal via one of radio resource control (RRC), downlink control information (DCI), or a medium access control-control element (MAC CE), when the network device is operating in a connected mode.

17. The RIS of claim 15, wherein the positioning availability signal is a system information block (SIB) signal and the PRS availability information is within assistance data in the SIB signal, when the network device is operating in one of an idle mode or an inactive mode.

18. The RIS of claim 15, wherein the at least one transceiver is configured to receive the positioning availability signal via L1 signaling using an early page indication (EPI)/paging physical downlink control channel (PDCCH), when the network device is operating in one of an idle mode or an inactive mode.

19. The RIS of claim 15, wherein the at least one transceiver is configured to receive the positioning availability signal via downlink control information (DCI) and the PRS availability information is within repurposed bits of the DCI, when the network device is operating in one of an idle mode or an inactive mode.

20. A method of wireless communication performed at a reconfigurable intelligent surface (RIS), the method comprising:

receiving, by the RIS from a satellite, a positioning reference signal; and reflecting, by the RIS, the positioning reference signal to produce a reflection positioning reference signal radiated towards a network device for positioning of the network device, wherein the method further comprising:

receiving, by the RIS from a network entity, a data signal comprising assistance data, wherein the assistance data comprises at least one of a watermark identification (ID) for the reflection positioning reference signal, a positioning reference signal (PRS) ID associated with the watermark ID, a timer for the network device to switch between positioning detection modes, or a quasi-colocation configuration (QCL) between synchronization signal blocks (SSBs) and positioning reference signals (PRSs) for the positioning of the network device; and reflecting, by the RIS, the data signal to produce a reflection data signal radiated towards the network device.

21. The method of claim 20, wherein the watermark ID is one of a RIS on-off pattern or a RIS specific phase.

22. The method of claim 20, wherein the positioning detection modes comprise a first positioning detection mode of detecting positioning signals directly transmitted from the satellite to the network device, and a second positioning detection mode of detecting positioning signals transmitted from the satellite to the network device via the RIS.

23. The method of claim 20, further comprising:

receiving, by the RIS from a network entity, a beam adaptation signal comprising beam adaptation information; and reflecting, by the RIS, the beam adaptation signal to produce a reflection beam adaptation signal radiated towards the network device.

24. The method of claim 23, wherein the beam adaptation information comprises at least one of: RIS downlink (DL) positioning beam pattern information with time stamps, and wherein the RIS DL positioning beam pattern information comprises the reflection positioning reference signal; one or more sets of beams, wherein each of the one or more sets of beams comprises a network device uplink (UL) positioning beam to align with a RIS downlink (DL) positioning beam; an angle of departure (AoD) for a network device uplink (UL) positioning beam to align with the reflection positioning reference signal; or a relative angle difference between an angle of departure (AoD) for a network device uplink (UL) positioning beam to align with the reflection positioning reference signal.

25. The method of claim 20, further comprising dynamically applying, to the RIS, a pair of voltages to fix a direction of the reflection positioning reference signal to align with a network device uplink (UL) positioning beam.

26. The method of claim 20, further comprising:

receiving, by the RIS from a network entity, a positioning availability signal comprising positioning reference signal (PRS) availability information; and reflecting, by the RIS, the positioning availability signal to produce a reflection positioning availability signal radiated towards the network device.

\* \* \* \* \*